United States Patent
Takebe et al.

(10) Patent No.: US 7,095,891 B1
(45) Date of Patent: Aug. 22, 2006

(54) PATTERN SEGMENTATION APPARATUS AND PATTERN RECOGNITION APPARATUS

(75) Inventors: Hiroaki Takebe, Kanagawa (JP); Yoshinobu Hotta, Kanagawa (JP); Satoshi Naoi, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/577,340

(22) Filed: May 24, 2000

(30) Foreign Application Priority Data

Jul. 6, 1999 (JP) ................................. 11-191576

(51) Int. Cl.
*G06K 9/34* (2006.01)

(52) U.S. Cl. ..................................... 382/177
(58) Field of Classification Search ................ 382/173, 382/177–179
See application file for complete search history.

(56) References Cited

U.S. PATENT DOCUMENTS 5,253,303 A * 10/1993 Whitesel et al. ............ 382/178
5,684,891 A * 11/1997 Tanaka et al. ............... 382/178
6,327,385 B1 * 12/2001 Kamitani ..................... 382/177

OTHER PUBLICATIONS

Nakagawa, S., "Pattern Information Processing," Maruzen Kabushiki Kaisha, Mar. 30, 1999, pp. 159 and 163-166.
Yoshimura, M., et al., "An Off-Line Verification Method for Japanese Signatures Based on a Sequential Application of Dynamic Programming Matching Method," IEICE Transactions, D-II, vol. J81-D-**, No. 10, Oct. 1998, pp. 2259, 2.1-2263, and 2.3.
Chinese Patent Office Action dated Sep. 10, 2004.

* cited by examiner

*Primary Examiner*—Jingge Wu
*Assistant Examiner*—Tom Y. Lu
(74) *Attorney, Agent, or Firm*—Staas & Halsey LLP

(57) ABSTRACT

A pattern segmentation apparatus and a pattern recognition apparatus can improve the segmentation precision of a character touching pattern. The pattern segmentation apparatus includes a feature amount extraction unit for extracting the feature amount of an image, a feature amount setting unit for setting the feature amount of a category, a feature amount comparison unit for comparing the feature amount of the category with the feature amount of the image, and a segmentation unit for segmenting a portion corresponding to the feature amount of the category from the image based on the comparison result.

23 Claims, 18 Drawing Sheets

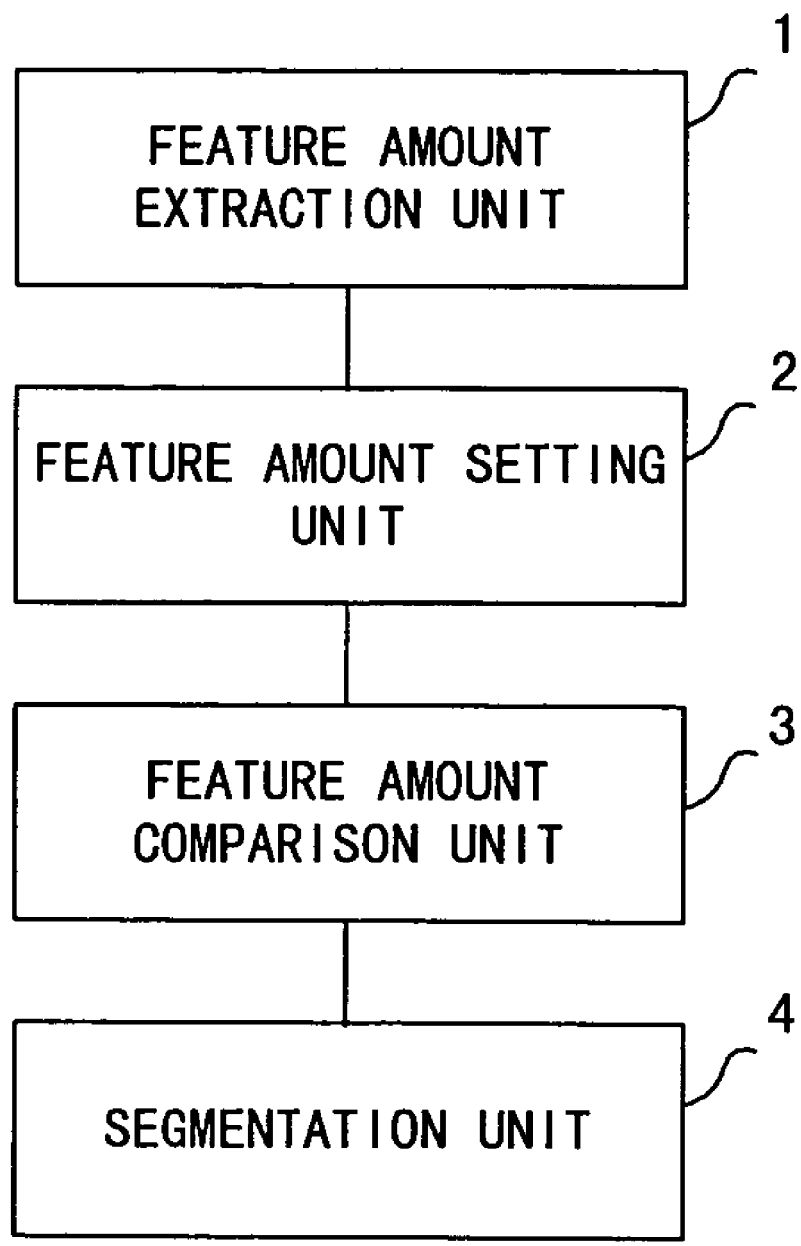
F I G. 1

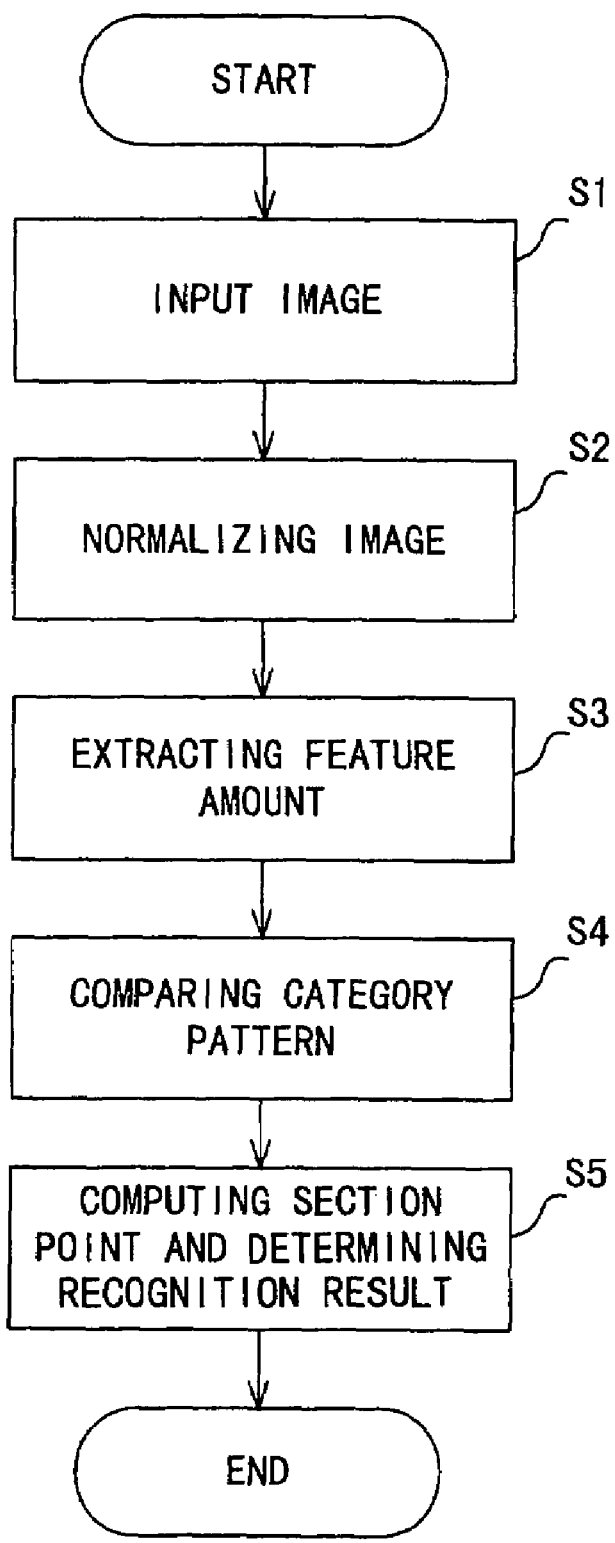
F I G. 3

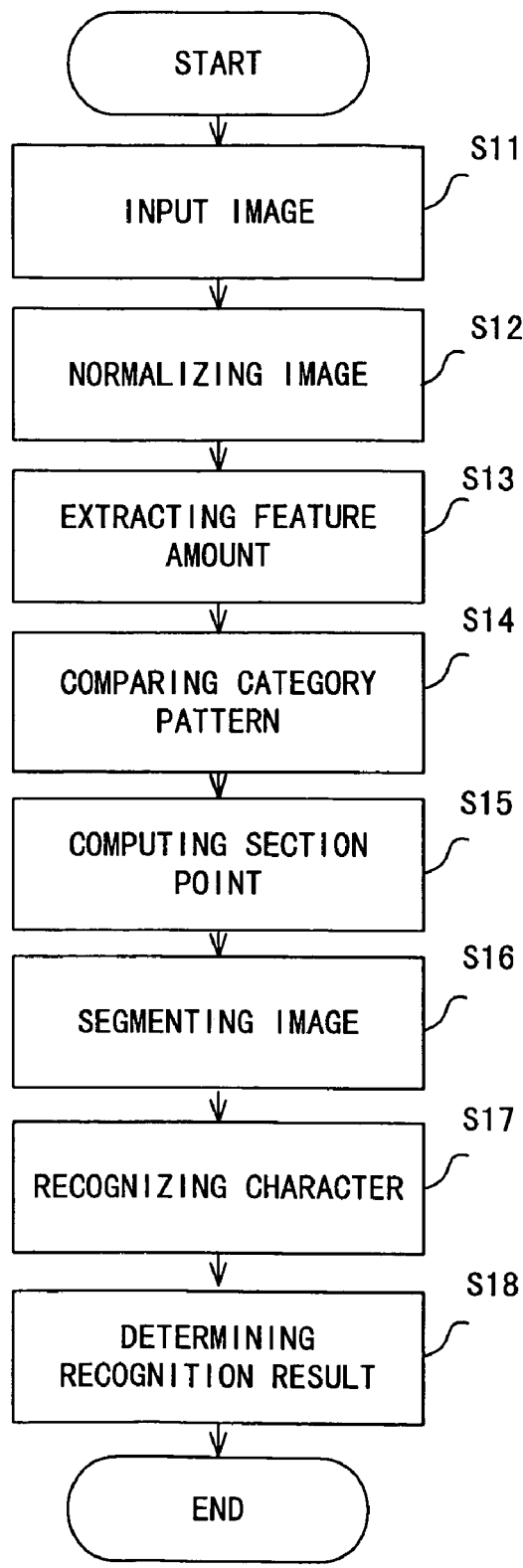
F I G. 4

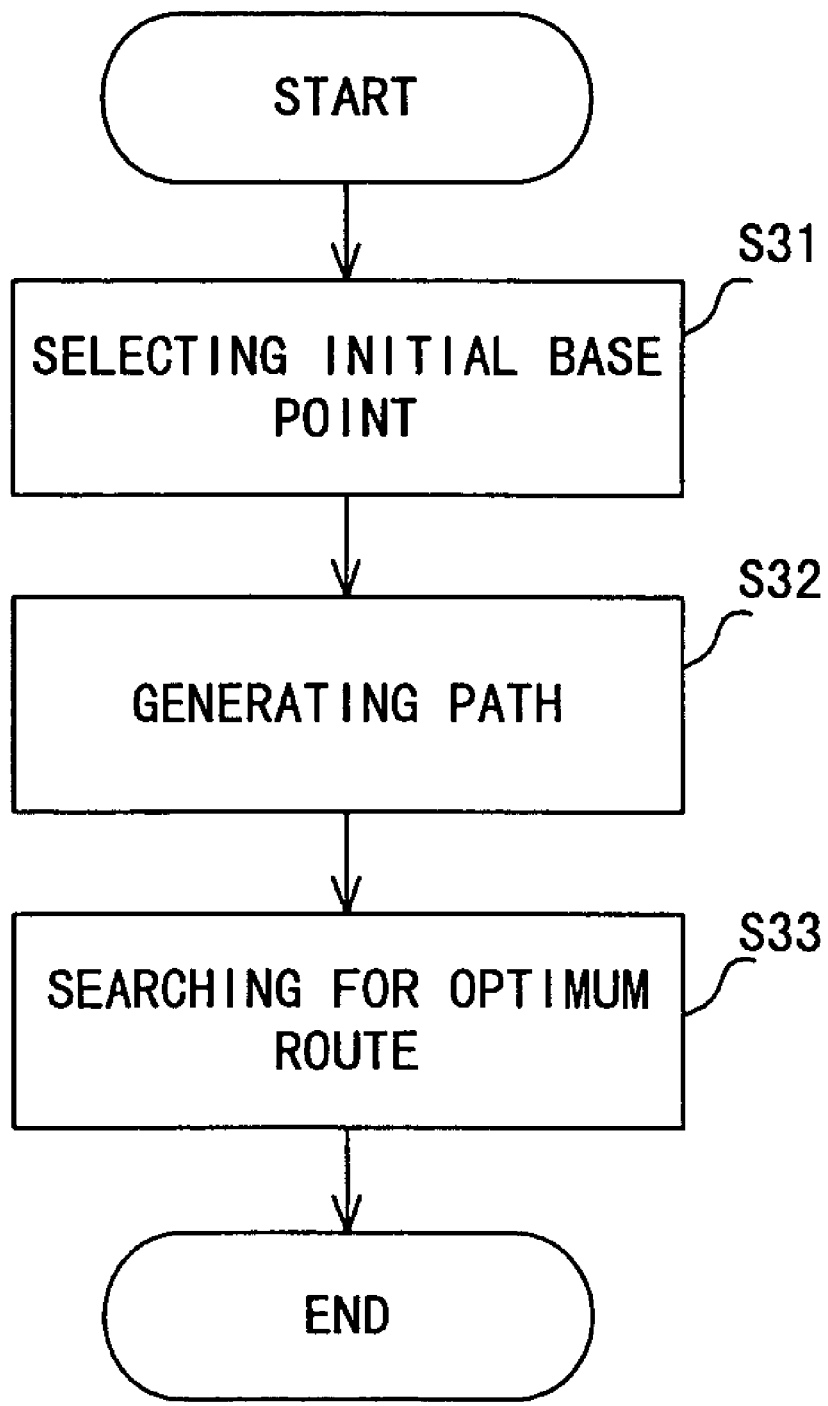
F I G. 1 3

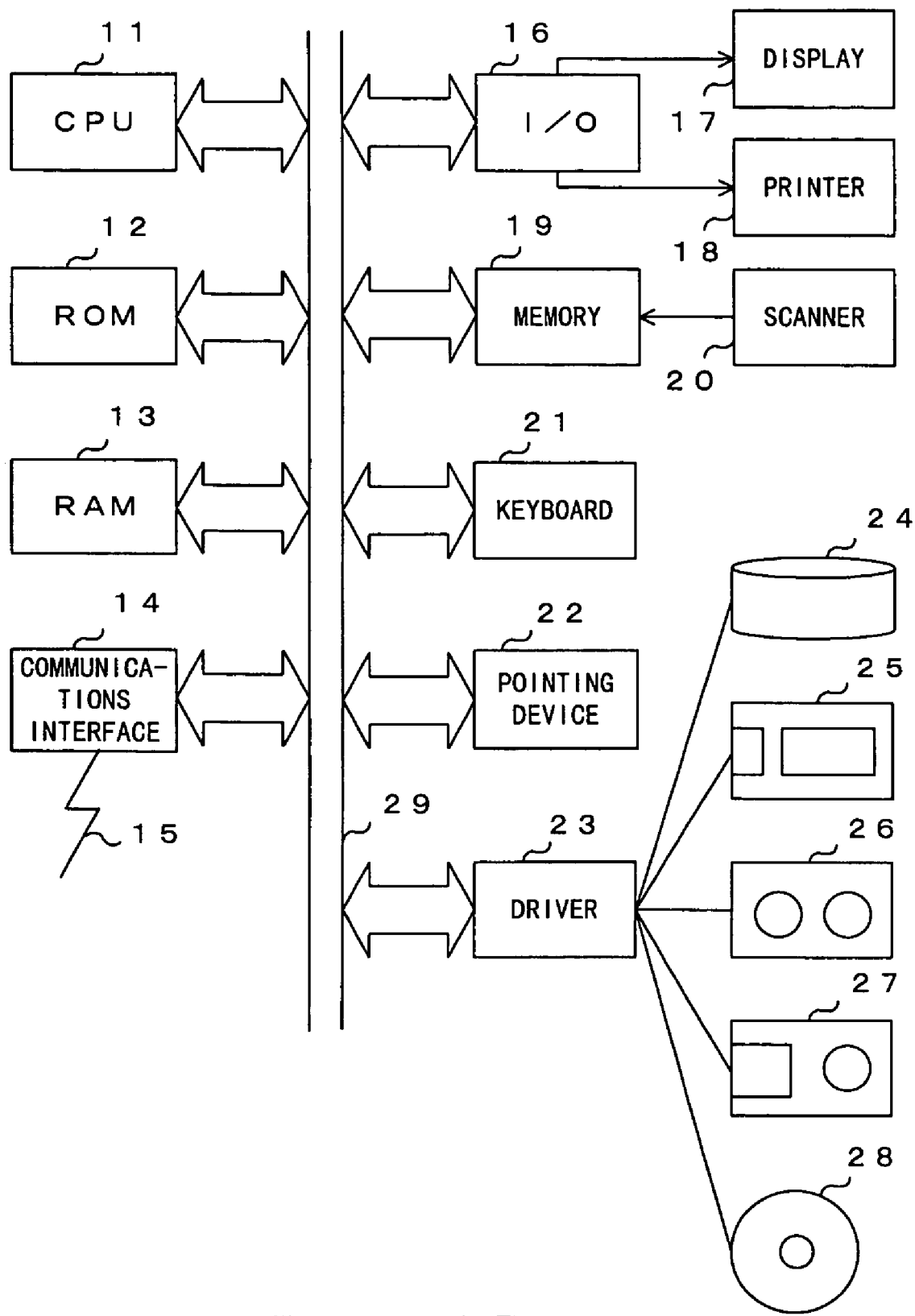
F I G. 17

PATTERN SEGMENTATION APPARATUS AND PATTERN RECOGNITION APPARATUS

BACKGROUND OF THE INVENTION

1. Field of the Invention

The present invention relates to a pattern segmentation apparatus and a pattern recognition apparatus, and more specifically to an application in which a one-character area is to be segmented from a character string image.

2. Description of the Related Art

In a conventional character recognizing process, it is necessary to segment a pattern corresponding to a character from a character string image. In this segmenting process, there are three main processes, that is, a labeling process, an overlap integrating process, a vertical integrating process (for horizontal writing), or a horizontal integrating process (for vertical writing). However, when two or more characters touch each other, or when two or more characters are written as incorporated into each other, these characters cannot be correctly segmented. Therefore, in the conventional segmenting process, the following method has been adopted to correctly segment the above described touching characters.

(1) A black pixel projection histogram (vicinal distribution) in the character string direction is generated, and the point of the minimum value is defined as a section point.

(2) The upper and lower outline of a character string is traced, and the point of the minimum value is defined as a section point.

However, some shapes of characters or the touching portions between characters do not indicate the minimum value of the vicinal distribution or the outline of touching points. Therefore, in the conventional method, there has been the problem that characters cannot be correctly sectioned at the touching point.

When the state of an image is not good, and when the image has a number of uneven portions in a pattern, a large number of section points are generated. Therefore, the entire system cannot be free from a bad influence of excess division according to a hypothetic verification.

SUMMARY OF THE INVENTION

The present invention aims at providing a pattern segmentation apparatus and a pattern recognition apparatus capable of improving the segmentation precision of a character touching pattern.

To solve the above described problem, the present invention compares the feature amount of a category with the feature amount of an image to segment the portion corresponding to the feature amount of the category from the image.

Thus, it is possible to segment a pattern corresponding to the feature amount of the category at the location of the pattern. Even when the touching position between patterns does not correspond to the minimum point of the black pixel projection histogram, patterns can be segmented at the position between the patterns. In addition, it is possible to collectively segment a portion corresponding to the feature amount of a category from an image. Therefore, although an image has a number of uneven portions in a pattern to be segmented, one pattern can be prevented from being divided into a large number of areas at the minimum point of the pattern, thereby improving the segmentation precision.

According to an aspect of the present invention, the first and the last elements of the feature amount set as an element sequence of a category in the array direction are independently moved in the character string array direction to allow the feature amount of the category to correspond to the feature amount of the character string image.

Thus, even when there arises the distortion or the deformation in a character string image, the comparison precision can be maintained between the feature amount of a category and the feature amount of the character pattern of the character string image, thereby preventing the feature amount of the category from not being matched when various character string images are input.

According to another aspect of the present invention, the first point of a category corresponding to the element of the character string image in the array direction is entered, and the next segmentation position is obtained from the element of the character string image corresponding to the first point of the category.

Thus, it is possible to extract another character area from a character string image such that other areas corresponding to the category can be serialized in the character string image, thereby efficiently extracting a plurality of character areas from the character string image.

According to a further aspect of the present invention, when there are a plurality of segmentation areas from an image, the segmentation areas can be combined with each other such that there are no areas, in the image, not corresponding to any category to be recognized.

Thus, it is possible to allow all areas in an image to be segmented to correspond with any category to be recognized. When there is a pattern remaining as not corresponding to any category, the segmentation position can be discarded, and the optimum segmentation position can be obtained even when a plurality of segmentation areas are obtained from an image. For example, an image containing only character strings does not include any pattern other than characters. Therefore, when a pattern not corresponding to any character is segmented from an image containing only character strings, it is determined that the segmentation position is wrong. Therefore, a wrong segmentation position can be avoided by determining a segmentation position such that all segmentation results from a character string to be segmented correspond to any character category, thereby improving the segmentation precision.

In addition, according to a further aspect of the present invention, the feature amount for segmentation of a category and the feature amount for recognition of a category are separately set, and a pattern segmented using the feature amount for segmentation of a category is recognized using the feature amount for recognition of a category.

Thus, it is possible to check whether or not a pattern segmented as an area corresponding to a category matches the category, thereby improving the character segmentation precision.

In addition, according to a further aspect of the present invention, when a pattern is segmented using the feature amount for segmentation of a category, the category is output as a recognition result of the pattern.

Thus, a recognition result of a pattern can be obtained only by performing a segmenting process from an image, and it is not necessary to perform a pattern recognizing process separately from a character recognizing process, thereby shortening the time required to obtain a pattern recognition result.

BRIEF DESCRIPTION OF THE DRAWINGS

FIG. 1 is a block diagram of the configuration of the pattern segmentation apparatus according to an embodiment of the present invention;

FIG. 3 is a flowchart of the pattern recognizing method according to the first embodiment of the present invention;

FIG. 4 is a flowchart of the pattern recognizing method according to the second embodiment of the present invention;

FIG. 13 is a flowchart of the method of computing the segmentation position according to an embodiment of the present invention;

FIG. 17 is a block diagram of the configuration realizing the pattern segmenting process and the pattern recognizing process according to an embodiment of the present invention.

DETAILED DESCRIPTION OF THE PREFERRED EMBODIMENTS

Figure 2A:
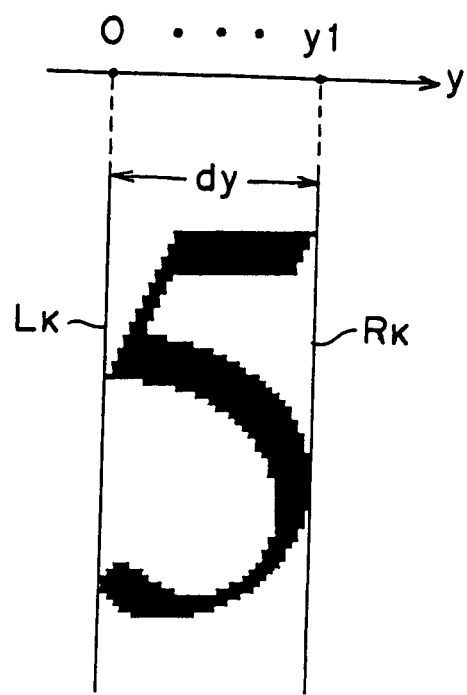
FIGS. 2A and 2B show the pattern segmenting method according to an embodiment of the present invention.

The pattern segmentation apparatus and the pattern recognizing method according to an embodiment of the present invention is described below by referring to the attached drawings.

FIG. 1 is a block diagram of the configuration of the pattern segmentation apparatus according to an embodiment of the present invention. In FIG. 1, a feature amount extraction unit 1 extracts the feature amount of an image. A feature amount setting unit 2 sets the feature amount of a category. A feature amount comparison unit 3 compares the feature amount of a category with the feature amount of an image for the entire image to be processed. A segmentation unit 4 segment the portion corresponding to the feature amount of the category from the image based on the comparison result by the feature amount comparison unit 3. A feature amount of a category and a feature amount of an image refer to the feature amount or a part of the feature amount from which the original pattern can be reproduced. For example, the peripheral features up to the n-th peripheral feature can be used as the feature amount of the category and the feature amount of the image.

Thus, only the pattern corresponding to the feature amount of a category can be collectively segmented from an image. Therefore, it is possible to prevent a pattern other than a character from being segmented or a character from being segmented in a divided state at a number of points, thereby improving the character segmentation precision. In addition, when a portion corresponding to the feature amount of a character exists in an image, the position of a portion corresponding to the character can be specified even when characters touch each other. Although the touching position of characters does not correspond to the minimum point of the black pixel projection histogram, a character can be segmented at the boundary of characters.

The feature amount of a category and the feature amount of an image are set in the character string array direction. The last and the first portions of the array of the feature amount of the category are independently scanned in the array direction, and the position of the optimum correspondence is obtained in the correspondence between the feature of the category and the feature amount of the image obtained in the scanning. For example, for the correspondence of the last portion of the array of the feature amount of a category, the correspondence of the first portion of the array of the feature amount of the category is obtained such that the optimum correspondence between the feature amount of the category and the feature amount of the image can be obtained.

Thus, a category can be scanned in an input image by enlarging and reducing the category when the portion corresponding to the feature amount of the category is extracted from the input image, thereby extracting the portion corresponding to the feature amount of the category from the input image with high precision even if a handwritten character is contained in the input image.

Figure 2B:
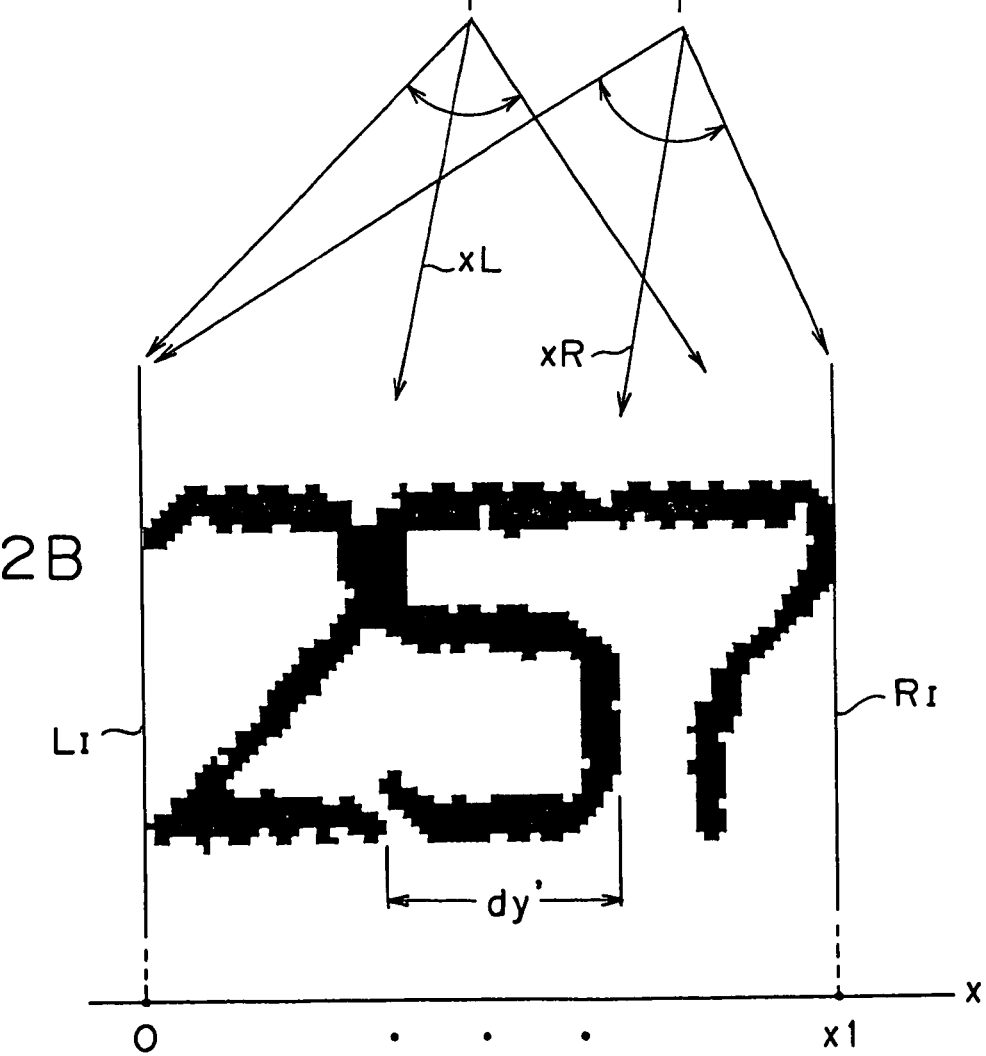

FIGS. 2A and 2B show the pattern segmenting method according to an embodiment of the present invention. In the embodiments described below, the feature amount of the category 5 is compared with the feature amount of the input image. This holds true with other categories. In FIG. 2A, the feature amount of the category 5 is set in the y axis direction, the feature amount of the leftmost point Lk of the category 5 corresponds to y=0, and the feature amount of the rightmost point Rk of the category 5 corresponds to y=y1. On the other hand, it is assumed that the touching characters 257 shown in FIG. 2B are input as an image to be segmented. When the touching characters 257 are input, an x axis is set in the character string-direction, the feature amount of the leftmost point L1 corresponds to x=0, and the feature amount of the rightmost point R1 touching characters 257 correspond to x=x1. Then, the rightmost point Rk and the leftmost point Lk of the category 5 are separately searched for in the range of 0 through x1 of the x axis, and the position of the optimum correspondence is obtained in the correspondence between the feature amount of the category 5 obtained in the scanning operation and the feature amount of the touching characters 257. As a result, assuming that when the rightmost point Rk of the category 5 corresponds to the xR of the x axis, and the leftmost point Lk of the category 5 corresponds to the xL of the x axis, the optimum correspondence is obtained between the feature amount of the category 5 and the feature amount of the touching characters 257, the coordinates xL and xR are candidates for the segmentation positions of the touching characters 257. Assuming that the number of pixels in the horizontal direction of the category 5 is dy, and the number of pixels of the portion corresponding to the category 5 of the touching characters 257 is dy', the portion corresponding to the category 5 can be extracted from the touching characters 257 with high precision by separately scanning the rightmost point Rk and the leftmost point Lk of the category 5 in the range of 0 through x1 of the x axis even when the number dy of the pixels in the horizontal direction of the category 5 is different from the number dy' of the pixels of the portion corresponding to the category 5 of the touching characters 257.

The feature amounts can be compared through a nonlinear enlargement/reduction matching method referred to as a continuous DP (dynamic programming). The continuous DP is described in, for example, 'Pattern Information Processing' by Seiichi Nakagawa, Maruzen Kabushiki Kaisha, pp. 163–166, 1999.

Thus, it is considered that the feature amount of the portion (portion to be segmented as a character of the category) corresponding to the category in an image is similar to the feature amount of the category. That is, a feature amount is defined for an image, and the portion similar to the feature amount of each category is searched for in the entire input image. First, the feature amount of each category is entered in a dictionary. Then, the feature amount is obtained for the entire input image, and compared with the feature amount of each category. As a result, information is obtained to what extent each category matches the input image, what portion of the input image matches each category, etc. Practically, for each category, the difference level at each coordinate and the correspondence between the coordinates exceeding the difference level can be obtained. Especially, the difference level obtained when each coordinate is defined as an end point, and the corresponding starting point are obtained. Assuming that the difference level equals the cost when a portion of an image is segmented from the starting point to the end point, and the portion is the category, the validity of each of the segmenting operations can be compared with each other. The segmentation position and the recognition result can be confirmed by searching for the combination of the segmenting operations with the highest validity.

FIG. 3 is a flowchart of the pattern recognizing method according to the first embodiment of the present invention. In the first embodiment, when the segmentation position in an image can be obtained by comparing the feature amount of a category, the category is defined as the recognition result of the pattern at the segmentation position. In FIG. 3, first, a normalizing process is performed (step S2) on the input image (step S1). In the normalizing process, the image is enlarged or reduced such that the vertical length equals a predetermined value, and then a smoothing process is performed on the resultant image. Then, the feature amount of the input image after the normalizing process is computed (step S3). The feature amount is represented as a sequence of integers (or vectors). The number of the integers is equal to the number of horizontal pixels of the normalized image. Each integer can be any value from 0 through 100.

Using the feature amount of each category entered in the dictionary, a comparing process through the continuous DP is performed on the entire image (step S4). As a result, the difference level of the optimum correspondence about each category and each coordinate, and the coordinate information about the starting point of the optimum correspondence are obtained. Then, based on the information, the section point is computed (step S5). Practically, assume that each optimum correspondence is represented by a path obtained by connecting the starting point with the end point, and defining the difference level as a weight. In the sequences of paths, the paths requiring the lowest cost are searched for. The sequences of the paths obtained as a result of the search, that is, the sequences of the starting points and the end points of the paths are output as a section point. In this case, the category for providing the paths is a recognition result.

FIG. 4 is a flowchart of the pattern recognizing method according to the second embodiment of the present invention. According to the second embodiment, the feature amount of the category for recognition is stored in the dictionary separately from the feature amount of the category for segmentation. When the segmentation position in an image is obtained by comparing the feature amount of the category for recognition with the feature amount of the category for segmentation, the pattern recognizing process is performed on the segmentation position using the feature amount of the category for recognition. In FIG. 4, the section point is computed by performing the same process as in steps S1 through S5 shown in FIG. 3 (steps S11 through S15). Then, an image is segmented at the section point (step S16), and the category is determined (step S18) based on the result of recognizing one character in the segmented pattern (step S17). Furthermore, a plurality of combinations of paths are output in order from the lowest cost. Then, one character is recognized as described above, and the optimum recognition result is defined as a recognition result.

In the above described embodiment, the peripheral features up to the n-th peripheral feature both from top and bottom can be used in horizontal writing. A part of the peripheral features up to the n-th peripheral feature can also be used. In the following example, the primary and secondary peripheral features both from top and bottom are used.

Figure 5:
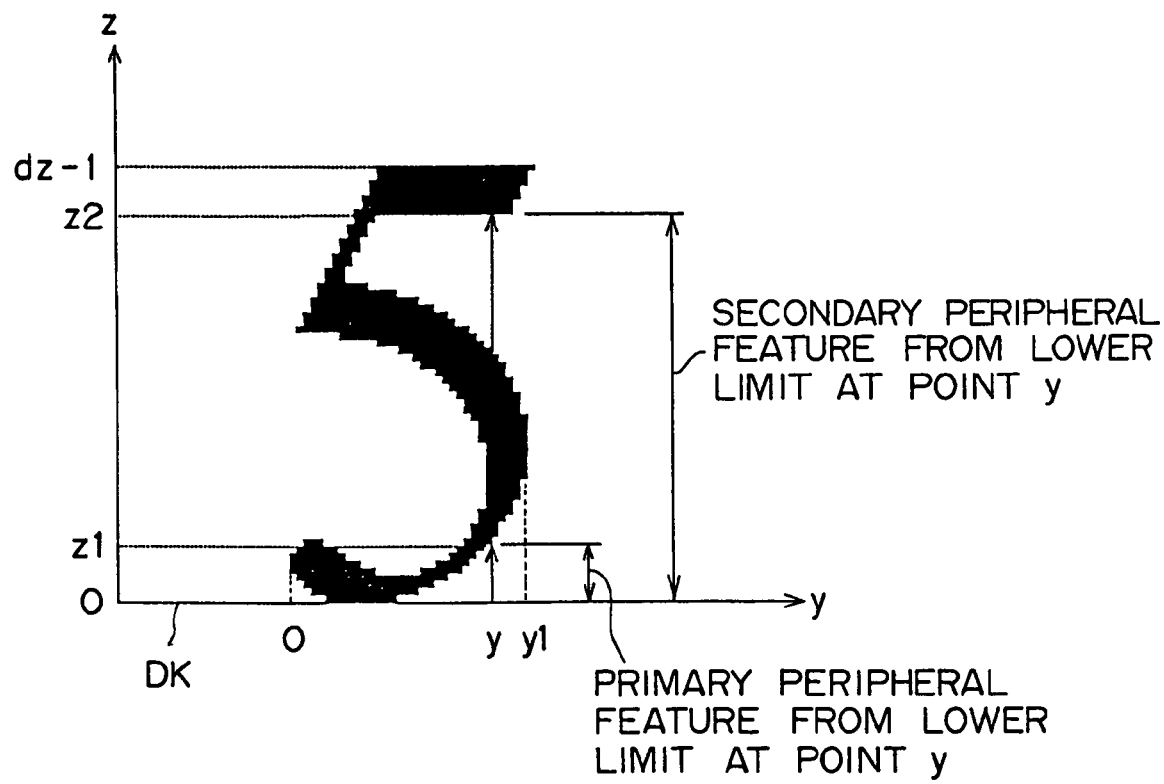
FIG. 5 shows the method of computing the peripheral features of the category according to an embodiment of the present invention.

FIG. 5 shows the method of computing the peripheral feature of a category according to an embodiment of the present invention. In the example shown in FIG. 5, the category 5 is described, but other category can be similarly processed. In FIG. 5, the lower side of the enclosing rectangle of the category 5 is referred to as a lower Dk. The y axis is set corresponding to the lower Dk, and the z axis is set vertical to the y axis. In addition, each pixel in the horizontal direction forming part of the category 5 is allowed to correspond to the y coordinate, and each pixel in the vertical direction forming part of the category 5 is allowed to correspond to the z axis. When a scanning line is vertically extended from the coordinate y of the lower Dk, the distance to the first black pixel of the category 5 is defined as z1. Assuming that the height of the enclosing rectangle of the category 5 is dz, the primary peripheral feature from the lower Dk at all the coordinate y of the category 5 can be obtained by the following equation.

$$\text{integer of } (z1/dz \times 100)$$

Similarly, assuming that the distance to the point at which a white pixel is changed into a black pixel is z2, the secondary peripheral feature from the lower Dk at the coordinate y of the category 5 can be obtained by the following equation.

integer of (z2/dz×100)

If the upper side of the enclosing rectangle of the category 5 is referred to as the upper limit, the primary and the secondary peripheral features from the upper limit at the coordinate y of the category 5 can be similarly obtained.

When the upper and lower primary and secondary peripheral features at the coordinate y of the category 5 are obtained, a set of these four values are allowed to correspond to each point on the y axis. At this time, the leftmost pixel of the category 5 corresponds to y=0, and the rightmost pixel of the category 5 corresponds to y=y1. Then, for y=0 through y1, the element sequence obtained by arranging the set of the four values of the upper and lower primary and secondary peripheral features in the y axis can be defined as the peripheral feature of the category 5.

Figure 6:
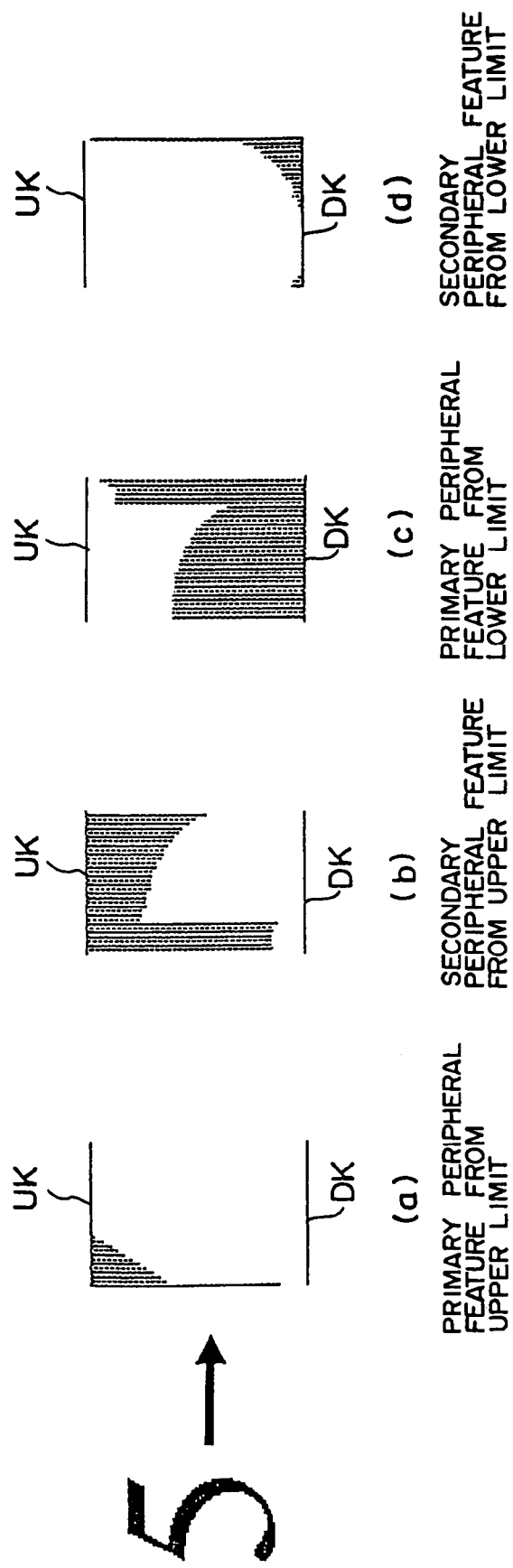
FIG. 6 shows the method of computing the peripheral features of the category according to an embodiment of the present invention.

FIG. 6 shows the computation result of the peripheral feature of the category 5 according to an embodiment of the present invention. FIG. 6A shows the primary peripheral feature from the upper Uk. FIG. 6B shows the secondary peripheral feature from the upper Uk. FIG. 6C shows the primary peripheral feature from the lower Dk. FIG. 6D shows the secondary peripheral feature from the lower Dk.

When the feature amount of a category is obtained using a learning sample, the number of horizontal pixels is predetermined for each category. Next, for each learning sample, the feature amount is computed in the above described method. Then, the image is enlarged or reduced, and the values of integers are leveled such that the number of sets of four integers of the feature amount can match the number the horizontal pixels predetermined for each category.

For an input image, the upper and lower limits of an input image are set, and the primary and secondary peripheral features from the upper and lower limits are obtained, thereby obtaining the peripheral features of the input image.

In vertical writing, the peripheral features to the n-th peripheral feature in both right and left directions. For example, a category can be compared with an input image using the primary and secondary peripheral features from the right end and the left end of an image.

Figure 7:
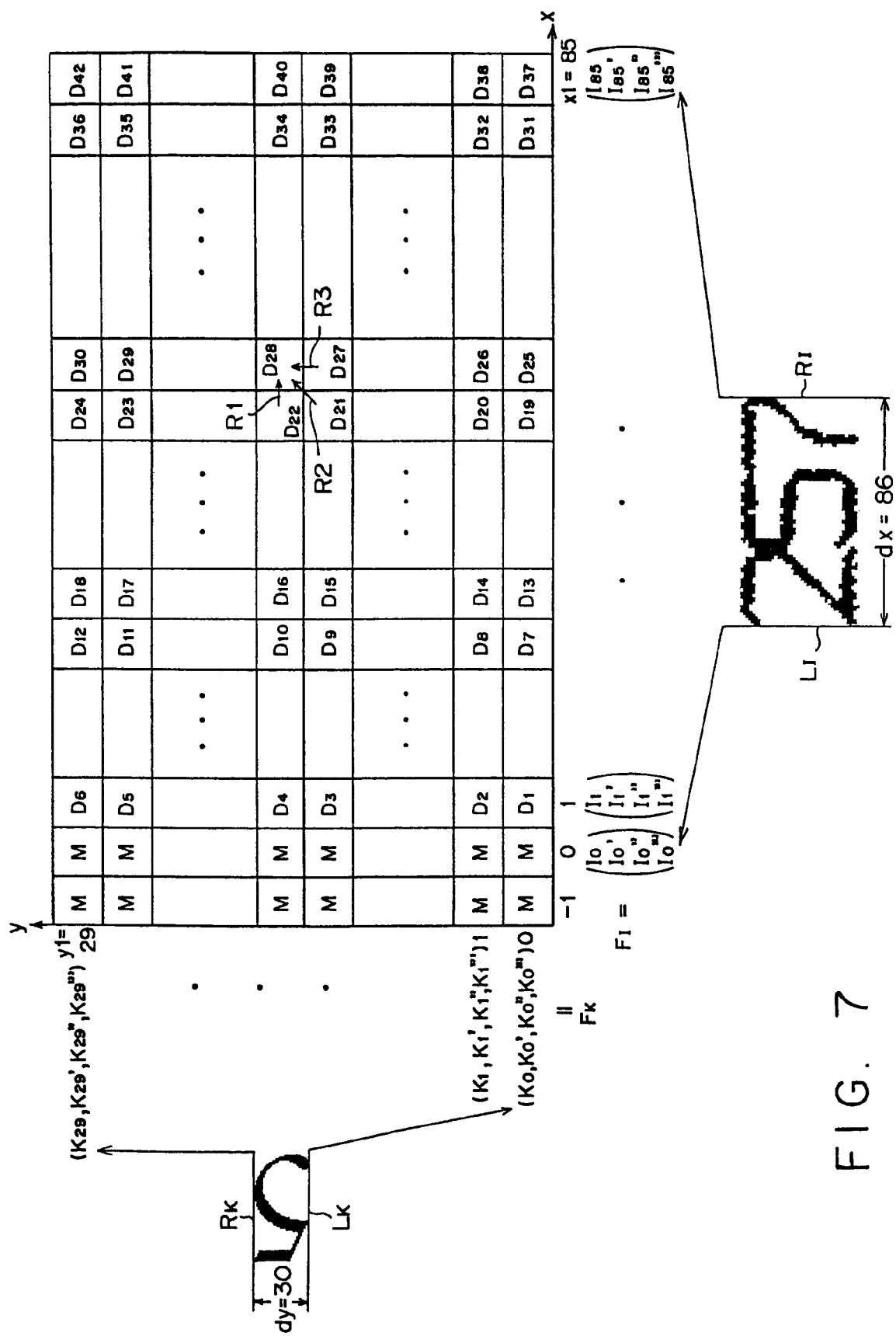
FIG. 7 shows the method of computing the difference level using the continuous DP according to an embodiment of the present invention.

FIG. 7 shows the method of computing the difference level through the continuous DP according to an embodiment of the present invention. In FIG. 7, assuming that a pattern comprising the touching characters 257 is input as an input image, the feature amount of each category stored in the dictionary is compared with the feature amount of the entire pattern comprising the touching characters 257.

The case in which the feature amount of the category 5 is compared with the feature amount of the entire pattern comprising the touching characters 257 in the feature amounts of the categories entered in the dictionary is described below. First, assuming that the number of pixels dy is 30 in the horizontal direction of the category 5, and the peripheral feature Fk of the category 5 is entered in the dictionary as a sequence of 30 sets of four integers, these 30 sets of four integers (k0, k0', k0'', k0'''), (k1, k1', k1'', k1'''), . . . , ((k29, k29', k29'', k29''') are allowed to correspond to the coordinates from y=0 to y=y1=29. In this example, k0, k1, . . . , k29 is the primary peripheral feature from the upper limit of the category 5 (corresponding to FIG. 6A), k0', k1', . . . , k29' is the secondary peripheral feature from the upper limit of the category 5 (corresponding to FIG. 6B), k0'', k1'', . . . , k29'' is the primary peripheral feature from the lower limit of the category 5 (corresponding to FIG. 6C), k0''', k1''', . . . , k29''' is the primary peripheral feature from the lower limit of the category 5 (corresponding to FIG. 6D).

In addition, assuming that the number dx of the pixels in the horizontal direction of the pattern comprising the touching characters 257 is 86, the left end LI of the pattern comprising the touching characters 257 is allowed to correspond to x=0, and the right end RI of the pattern comprising the touching characters 257 is allowed to correspond to x=85. Then, the peripheral feature FI of the pattern comprising the touching characters 257 is extracted as a sequence of 86 sets of 4 integers. These 86 sets of 4 integers (I0, I0', I0'', I0'''), (I1, I1', I1'', I1'''), . . . , (I85, I85', I85'', I85''') are allowed to correspond to the coordinates of x=0 through x=x1=85. In this example, I0, I1, . . . , I85 are the primary peripheral features from the upper limit of the pattern comprising the touching characters 257. I0', I1', . . . , I85' are the secondary peripheral features from the upper limit of the pattern comprising the touching characters 257. I0'', I1'', . . . , I85'' are the primary peripheral features from the lower limit of the pattern comprising the touching characters 257. I0''', I1''', . . . , I85''' are the secondary peripheral features from the lower limit of the pattern comprising the touching characters 257.

Next, when the peripheral feature FI of the pattern comprising the category 5 on the x axis, and the feature amount Fk of the category 5 on the y axis are obtained, 30 elements of the peripheral feature Fk of the category 5 are allowed to correspond to the elements of the peripheral feature FI of the touching characters 257. In the correspondence, the optimum correspondence is obtained, and the position of the element on the x axis in the optimum correspondence can be defined as a candidate for the segmentation position of the touching characters 257. At this point, the accumulation value of the distance between elements is obtained, and is normalized by the weight. Then, the smallest correspondence for the normalized value can be defined as the optimum correspondence.

Figure 8:
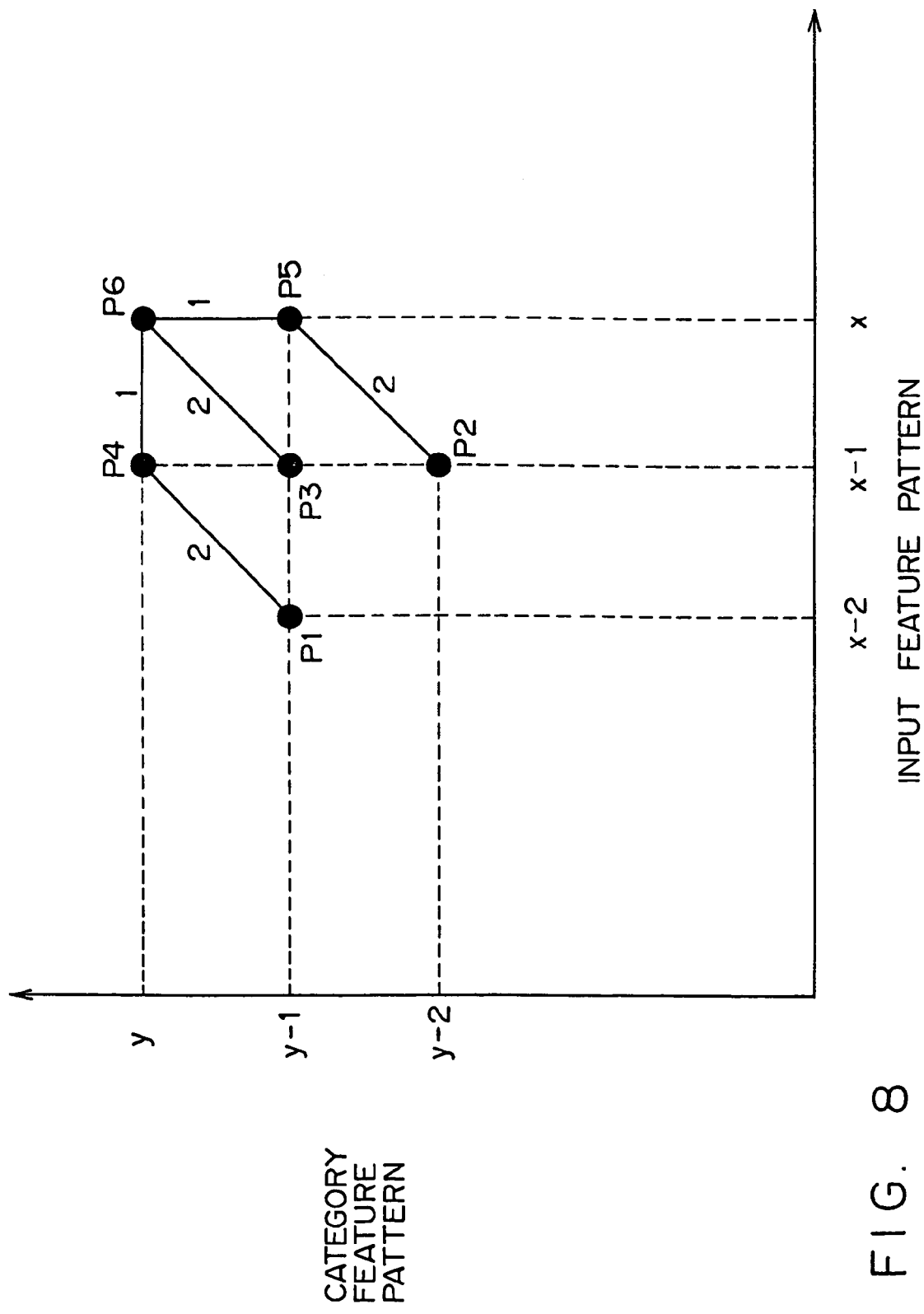
FIG. 8 shows the path through which the current point is reached in the continuous DP according to an embodiment of the present invention.

Assuming that the correspondence between the element of an input pattern and the element of a category is referred to as a route, the optimum route up to the current point (x, y) can be obtained by selecting the route indicating the smallest difference level in the past routes up to the current point (x, y). In the correspondence between a category and an input pattern, assuming that the order in a sequence of elements is not inverted, and no jump is made in adopting elements forming part of the sequence, the route up to the current point (x, y) is limited to the three paths as shown in FIG. 8.

Therefore, when the optimum route up to the current point (x, y) is obtained, the optimum route up to the current point (x, y) is obtained by first obtaining the optimum route up to the past point, and then selecting the route indicating the lowest difference level in the three routes from the past point up to the current point (x, y).

Practically, in the range of $0 \leq x \leq 1$ and $0 \leq y \leq 1$, the accumulation value q (x, y) of the difference level for the optimum route up to the point (x, y) can be obtained by the gradual change equations (1) through (8) of an accumulation value.

Gradual Change Equation $0 \leq x \leq x1, 0 \leq y \leq y1$ $$q(-1,y)=q(0,y)=M \qquad (1)$$

where M indicates a sufficiently large value $$q(x,0)=2d(x,0) \qquad (2)$$

$$q(x,1)=\min$$

$$\{q(x-2,0)+2d(x-1,0)+d(x,1) \quad (3)$$

$$q(x-1,0)+2d(x,0) \quad (4)$$

$$q(x,0)+d(x,1)\} \quad (5)$$

$$q(x,y)=\min$$

$$\{q(x-2,y-1)+2d(x-1,y)+d(x,y) \quad (6)$$

$$q(x-1,y-1)+2d(x,y) \quad (7)$$

$$q(x-1,y-2)+2d(x,y-1)+d(x,y)\} \quad (8)$$

where the distance d (x, y) can be defined by, for example, the following city block distance.

$$d(x,y)=\Sigma_{n=1,2}|IPn,\text{up}(x)-Kn,\text{up}(y)|+|IPn,\text{down}(x)-Kn,\text{down}(y)| \quad (17)$$

where IPn, up (x) indicates the n-th peripheral feature from the upper limit of the input image at the point x, IPn, down (x) indicates the n-th peripheral feature from the lower limit of the input image at the point x, Kn, up (y) indicates the n-th peripheral feature from the upper limit of the category at the point y, and Kn, down (y) indicates the n-th peripheral feature from the lower limit of the category at the point y.

The distance d (x, y) can be defined by an Euclidian distance, etc.

In FIG. 8, assuming that the accumulation value of the difference level to the point P1 is q (x−2, y−1), the accumulation value of the difference level to the point P2 is q (x−1, y−2), the accumulation value of the difference level to the point P3 is q (x−1, y−1), the accumulation value of the difference level to the point P4 is d (x−1, y), the accumulation value of the difference level to the point P5 is d (x, y−1), and the accumulation value of the difference level to the point P6 is d (x, y), the equation (6) corresponds to obtaining the accumulation value q (x, y) at the difference level to the point P6 through the route P1→P4→P6 shown in FIG. 8, the equation (7) corresponds to obtaining the accumulation value q (x, y) at the difference level to the point P6 through the route P3→P6 shown in FIG. 8, and the equation (8) corresponds to obtaining the accumulation value q (x, y) at the difference level to the point P6 through the route P2→P5→P6 shown in FIG. 8.

The weight g (x, y) corresponding to the accumulation value q (x, y) can be obtained by the gradual change equations (9) through (16) of the weight.

Gradual Change Equation of Weight $$g(-1,y)=g(0,y)=0 \quad (9)$$

$$g(x,0)=2 \quad (10)$$

$$g(x,1)=\{g(x-2,0)+3 \quad (11)$$

$$g(x-1,0)+2 \quad (12)$$

$$g(x,9)+1\} \quad (13)$$

$$g(x,y)=\{g(x-2,y-2)+3 \quad (14)$$

$$g(x-1,y-1)+2 \quad (15)$$

$$g(x-1,y-2)+3\} \quad (16)$$

where the gradual change equations (9) through (16) of weight respectively correspond to the gradual change equations (1) through (8) of accumulation values.

The accumulation value q (x, y) of a difference level and the weight g (x, y) are obtained by the equations (1) through (16), the difference level D (x, y) between an input image for the optimum route to the point (x, y) and a category can be obtained by the equation (17).

$$D(x,y)=q(x,y)/g(x,y) \quad (18)$$

Using the above described equation, the difference level D (x, y) between the input image for at the optimum route to the point (x, y) and the category can be obtained for each point (x, y) shown in FIG. 7. To obtain the difference level D (x, y) of the current point (x, y) it is necessary to obtain the difference level of the past point. Therefore, the value of M is set by the equation (1) as the difference level corresponding to the point of x=−1 and x=0. Then, the difference level D (x, y) is obtained in the order of D1→D2→ . . . →D6→ . . . →D7→D8→ . . . → D12→ . . . →D37→D38 . . . →D42.

In addition, for example, when the difference level D28 of the current point (x, y) is obtained, the route to the current point (x, y) can be any of the three routes R1 through R3. By substituting the accumulation value q (x, y) in the equation (6) and the weight g (x, y) in the equation (14) for the equation (18), the difference level D (x, y) to the current point (x, y) through the route R1 can be obtained. Similarly, by substituting the accumulation value q (x, y) in the equation (7) and the weight g (x, y) in the equation (15) for the equation (18), the difference level D (x, y) to the current point (x, y) through the route R2 can be obtained. Furthermore, by substituting the accumulation value q (x, y) in the equation (8) and the weight g (x, y) in the equation (16) for the equation (18), the difference level D (x, y) to the current point (x, y) through the route R3 can be obtained. Therefore, in the three routes R1 through R3, the difference level D28 of the current point (x, y) can be obtained by selecting the route indicating the lowest difference level. When one of the three routes R1 through R3 to the current point (x, y) is selected, the selected route is entered.

Figure 9:
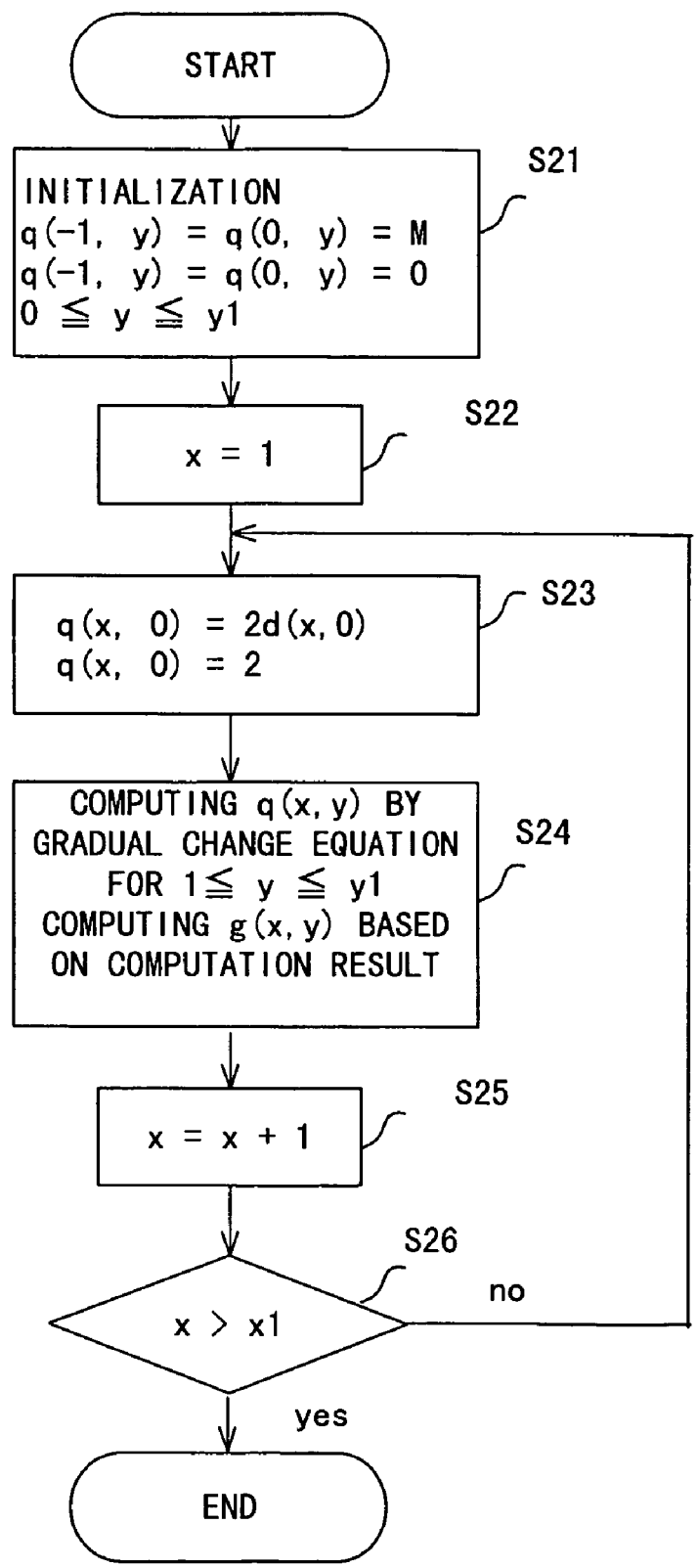
FIG. 9 is a flowchart of the method of computing the difference level using the continuous DP according to an embodiment of the present invention.

FIG. 9 is a flowchart of the method of computing the difference level using the continuous DP according to an embodiment of the present invention. In FIG. 9, the initializing process is performed first (step S21). In the initializing process, in the range of 0≦y≦y1, q (−1, y)=q (0, y)=M is set, and g (−1, y)=g (0, y)=0 is set. Then, x=1 is set (step S22), and q (x, 0)=2d (x, 0), and g (x, 0)=2 is set (step S23). Then, for y=1, the accumulation value q (x, y) is obtained by the equations (3) through (5), and the weight g (x, y) corresponding to the accumulation value q (x, y) is obtained by the equations (11) through (13). In addition, in the range of 2≦y≦y1, the accumulation value q (x, y) is obtained by the equations (6) through (8), and the weight g (x, y) corresponding to the accumulation value q (x, y) is obtained by the equations (14) through (16) (step S24). The above described process is repeated with the value of x increased by 1 (step S25) until x equals x1 (step S26).

In the above described process, the optimum route to the point (x, y) and the corresponding difference level can be obtained in the range of 0≦x≦1, and 0≦y≦y1. When the optimum route to the point (x, y) is obtained, the starting point (x0, y0) corresponding to the point (x, y) can be obtained by inversely tracing the route. The correspondence can be represented as follows.

$$x0 = Stc(x,y)$$

$$y0 = Sty(x,y)$$

Figure 10:
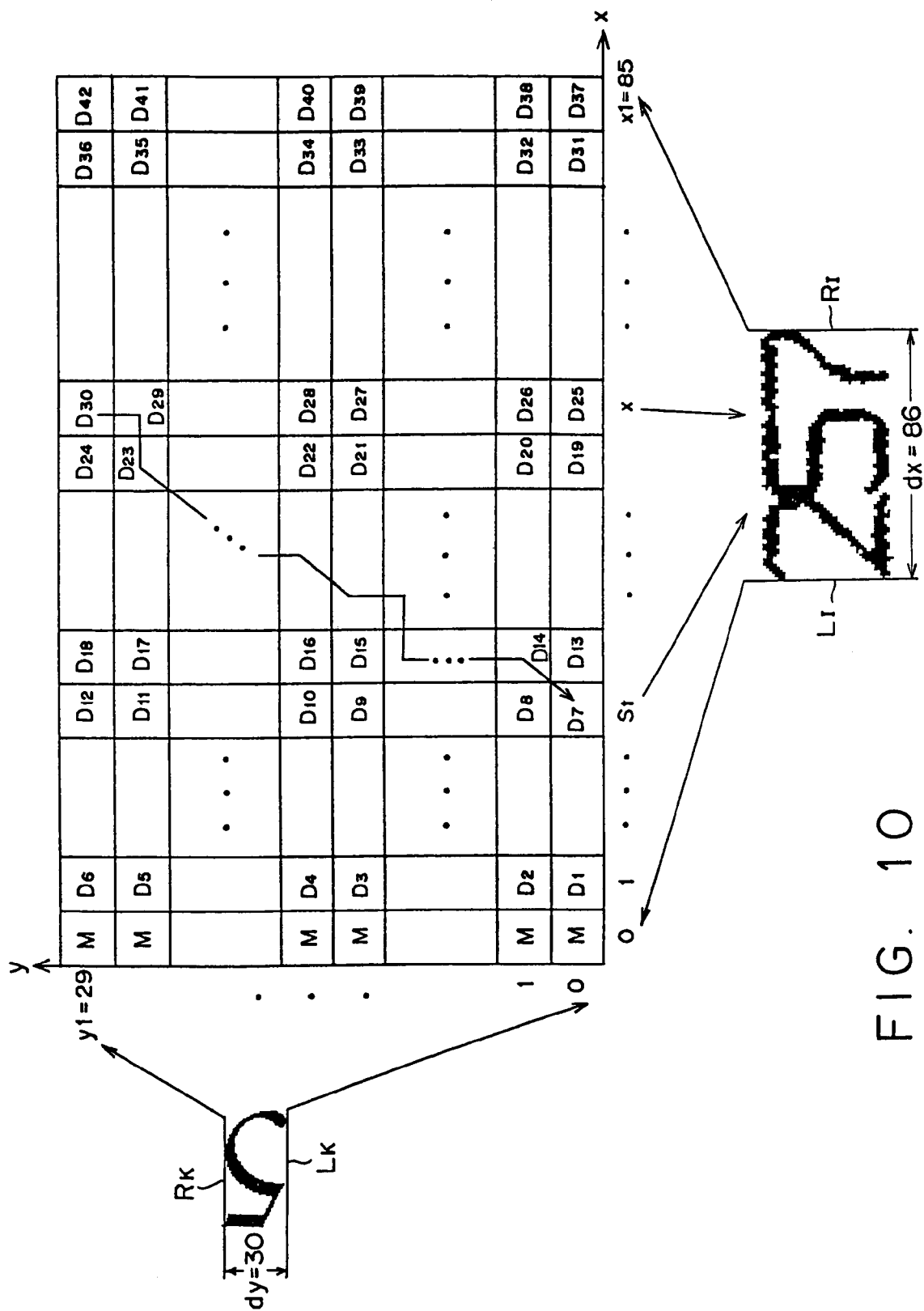
FIG. 10 shows the method of searching for the starting point according to an embodiment of the present invention.

As shown in FIG. 10, the point (st, 0) corresponding to the leftmost point Lk of the category 5 is searched for by inversely tracing the optimum route to the point (x, y1) corresponding to the rightmost point Rk of the category 5. When the point (st, 0) corresponding to the leftmost point Lk, the value st on the x axis is defined as the starting point of the category 5 at the coordinate x.

As described above, the comparison result of the category K and the coordinate x can be obtained as follows with the difference level defined as Sc (x, K) and the starting point as St (x, K).

$$Sc(x,K) = D(x,dy-1)$$

$$St(x,K) = Stx(x,dy-1)$$

In the above described process, when the difference level is set smallest with the rightmost point Rk of the category 5 corresponding to the point x in the horizontal direction of the touching characters 257, the point st in the horizontal direction of the touching characters 257 corresponding to the leftmost point Lk of the category 5, and the corresponding difference level can be obtained.

The above described process is performed on the pattern comprising the touching characters 257 for all categories K to be recognized. For example, assuming that the category K to be recognized is 0 through 9, the above described process is performed for all categories 0 through 9. Then, in the range of $0 \leq x \leq x1$, the starting point St (x, K) and the corresponding difference level Sc (x, K) are obtained for each category K.

Figure 11:
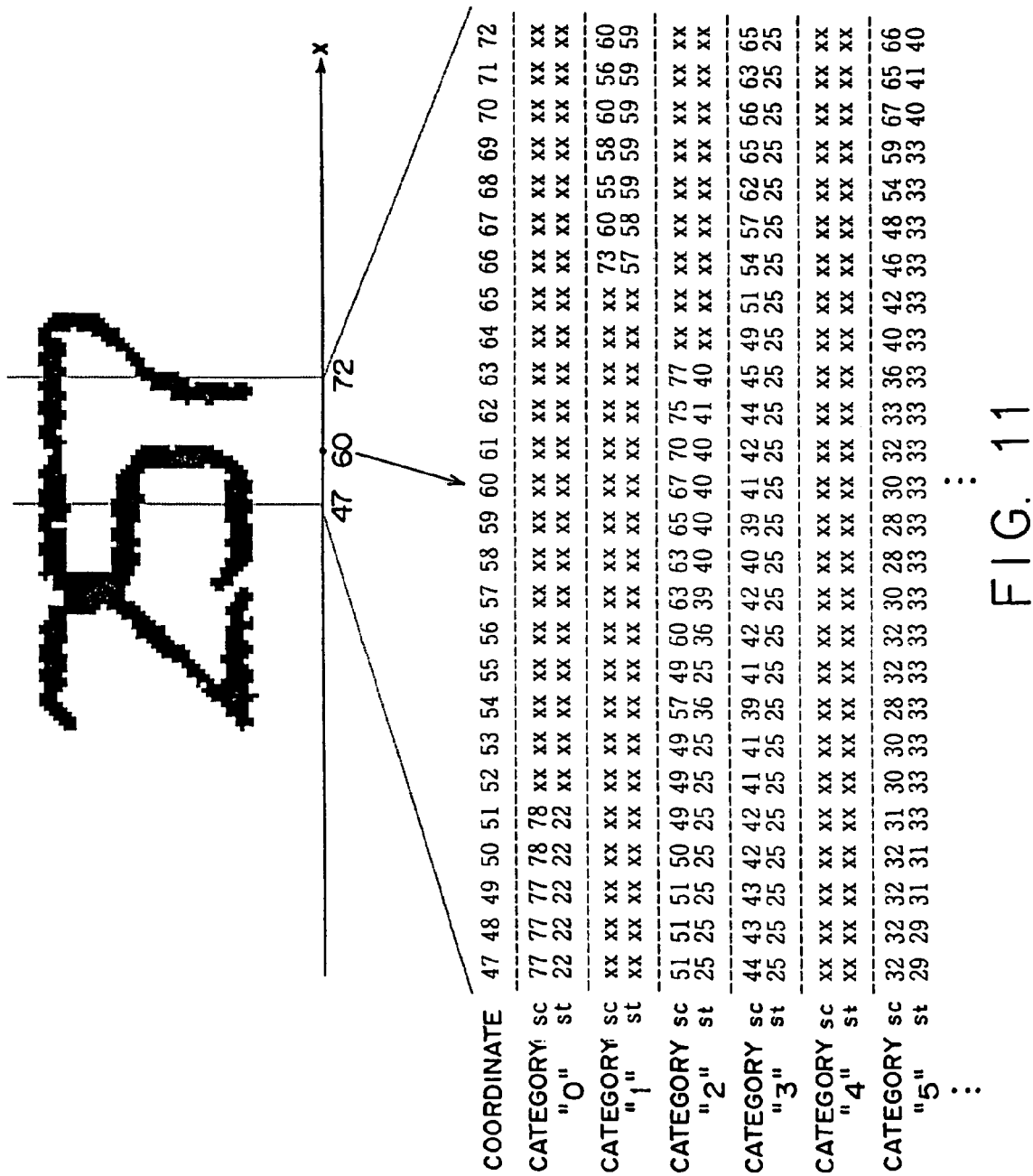
FIG. 11 shows a part of the result of computing the starting point and the difference level according to an embodiment of the present invention.

FIG. 11 shows a part of the result of computing for each category the starting point and the corresponding difference level according to an embodiment of the present invention. In the example shown in FIG. 11, only the range of $47 \leq x \leq 72$ is shown, and other ranges of x are omitted. In addition, when the difference level sc is equal to or larger than a predetermined threshold, it is represented by xx. In FIG. 11, for example, when x=60, the difference level sc is not smaller than a predetermined threshold for the categories 0, 1, and 4 although the starting point st is set to any point on the x axis. For the category 2, the difference level sc is the lowest when the rightmost point of the category 2 is set to the point x=60, and the corresponding difference level sc=67 by setting the starting point st=40 (in this case, the operation corresponds to setting the leftmost point of the category 2 at the point of x=40). For example, for the category 5, the difference level sc is the lowest when the rightmost point of the category 5 is set to the point of x=60, and the corresponding difference level sc is 30 by setting the starting point st to 33.

Figure 12:
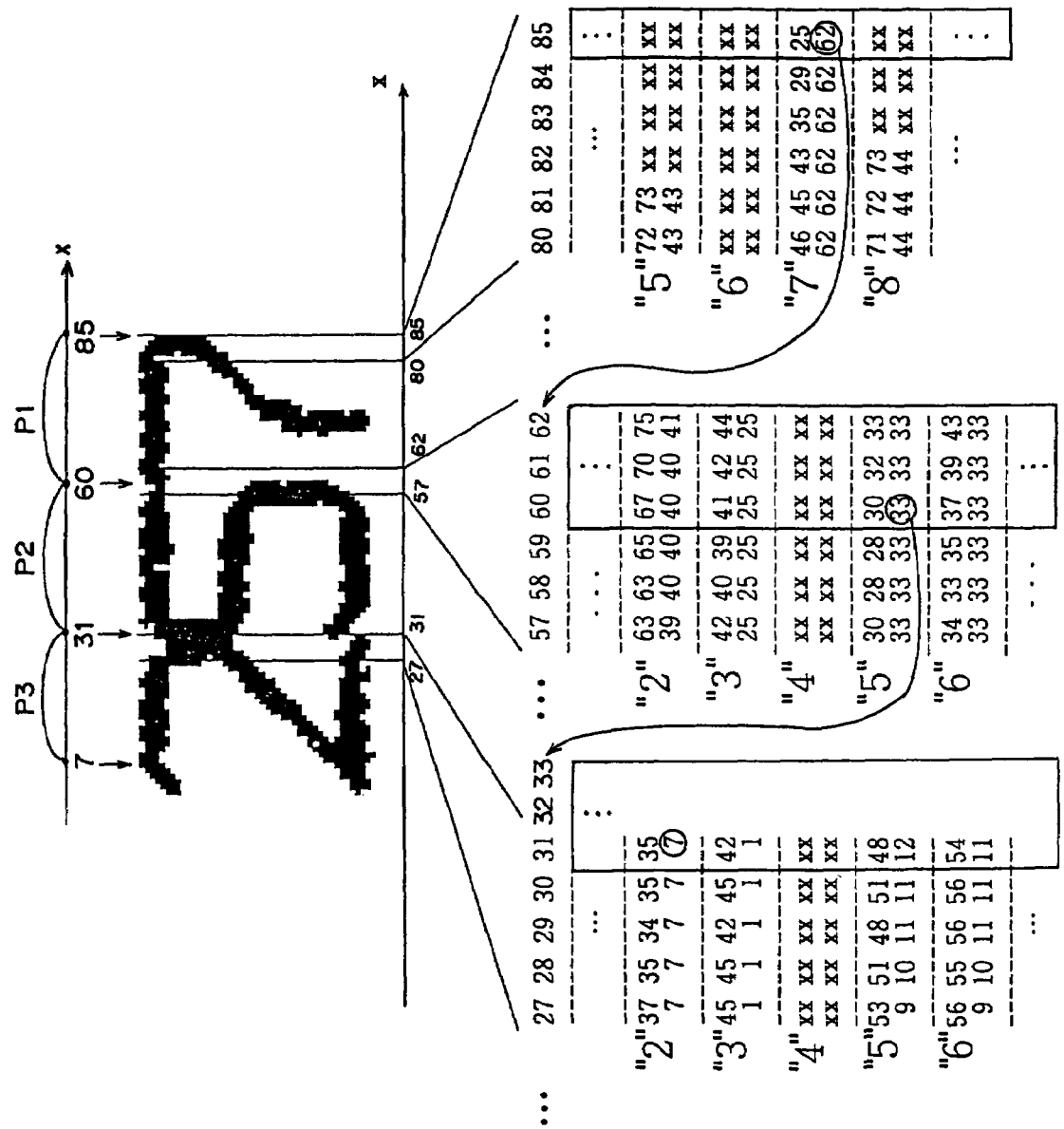
FIG. 12 shows the method of searching for the path of the segmentation position from the computation result shown in FIG. 11.

FIG. 12 shows the method of searching for the route of a segmentation position from the computation result shown in FIG. 11. In FIG. 12, assuming that the category K to be recognized is 0 through 9, and the number w1 of pixels in the horizontal direction of the pattern of the touching characters 257 to be segmented is 86, the starting point st and the corresponding difference level sc are obtained for all categories 0 through 9 in the range of $0 \leq x \leq x1=85$. In this case, for example, the point of x=85 at the rightmost point of the pattern of the touching characters 257 is considered (hereinafter the point is referred to as an initial base point). Then, it is checked whether or not the difference level sc equal to or lower than the threshold TH can be detected in the difference levels sc corresponding to the point of x=85.

In this example, if the threshold TH is set to, for example, 35, then the difference level sc of the category 7 is 25, thereby detecting the category 7 with the difference level sc equal to or smaller than the threshold TH of 35. When the category 7 is detected at the point of x=85, the starting point corresponding to the category 7 at the point of d=85 is checked. As a result, since the starting point st of the category 7 at the point x=85 is 62, the segmentation position of the pattern of the touching characters 257 is obtained from the starting point st=62. When the segmentation position of the rightmost point of the pattern corresponding the category 7 is set to x=85, and when the segmentation position of the leftmost point of the pattern corresponding the category 7 is set to x=62, the starting point st=62 indicates the lowest difference level sc. In addition, the corresponding difference level sc is 25. Therefore, the next segmentation position of the pattern of the touching characters 257 is assumed to be within the range back from x=st=62 by a predetermined value of th. For example, if the predetermined value th=2, the search range, of the next segmentation position is set to x=60 through 62, and it is checked whether or not the difference level sc equal to or lower than the threshold TH exists in the difference levels sc corresponding to the points x=60 through 62. Since the difference level sc of the category 5 at the point x=60 is 30, the category 5 of the difference level sc equal to or lower than the threshold TH=35 is detected. When the category 5 is detected at the point x=60, the coordinate x=60 is defined as the next segmentation position of the pattern of the touching characters 257 (hereinafter the point is referred to as a base point). The path P1 connecting the point of the initial segmentation position where x=85 with the point of the next segmentation position where x=60 is generated.

When the path P1 is generated, the starting point st corresponding to the category 5 at the point x=60 is checked. As a result, it is proved that the starting point st of the category 5 at the point x=60 is 33, the next segmentation position of the touching characters 257 is obtained from the starting point st=33. Accordingly, the search range for the next segmentation position is x=31 through 33, and it is checked whether or not the difference level sc equal to or lower than the threshold TH exists in the difference levels sc corresponding to the point x=31 through 33. Since the difference level sc of the category 2 at the point x=31 is 35, the category 2 of the difference level sc equal to or lower than the threshold TH=35 is detected. When the category 2 at the point x=31 is detected, the coordinate x=31 is defined as the next segmentation position of the touching characters 257. In addition, the path P2 connecting the point at the segmentation position where x=60 to the point at the next segmentation position where x=31 is generated.

When the path P2 is generated, the starting point st corresponding to the category 2 at the point x=31 is checked. As a result, since it is proved that the starting point st of the category 2 at the point x=31 is 7, the next segmentation position of the pattern of the touching characters 257 is obtained from the starting point st=7. Assuming that there is no pattern corresponding to the categories 0 through 9 in the range before x=7, the segmentation position of the pattern of the touching characters 257 is defined as the point x=7 (hereinafter the point is referred to as a source point). Then, the path P2 connecting the point of the segmentation position where x=31 to the point of the next segmentation position where x=7 is generated, thereby terminating the segmenting process.

In the above described process, the pattern of the touching characters 257 can be sectioned at the boundary between 2 and 5, and 5 and 7. When the paths P1 through P3 are obtained for the pattern of the touching characters 257, the segmentation positions obtained by performing the segmenting process through the route P1→P2→P3 can be evaluated by considering the weight for the paths P1 through P3. As the weight of the paths P1 through P3, the difference level sc between each of the patterns segmented corresponding to the paths P1 through P3 and the category corresponding to each of the patterns can be used. For example, the weight of the path P1 is 25 obtained from the difference level sc of the category 7 at the point where x=85, the weight of the path P2 is 30 obtained from the difference level sc of the category 5 at the point where x=60, and the weight of the path P3 is 35 obtained from the difference level sc of the category 2 at the point where x=31. When the weight of the paths P1 through P3 is obtained, the value v=90/3=30 obtained by dividing the total weight q=25+30+35=90 of the paths P1 through P3 by the number b=3 of paths P1 through P3 is defined as a segmentation position evaluation value.

FIG. 13 is a flowchart of the method of computing the segmentation position according to an embodiment of the present invention. In FIG. 13, the initial base point selecting process is performed first (step S31). In this initial base point selecting process, the difference level Sc (dx−1, K) entered corresponding to the coordinate x=dx−1 of the rightmost point of the input pattern is considered. The categories K are arranged in order from smallest to largest in difference level Sc (dx−1, K), and m smallest categories in difference level Sc (dx−1, K) are selected from a set of categories K. Assuming that the m smallest categories are K1, K2, . . . , Km, the initial base point is defined as (dx−1, K1), (dx−1, K2), . . . , (dx−1, Km). The characters dx indicate the number of pixels in the horizontal direction of an input pattern.

Then, a paths generating process is performed (step S32). For each initial base point in this path generating process, the correspondence between an input image and each category is regarded as a path connecting the starting point and the end point, and the difference level of the correspondence is defined as the weight of a path. In addition, the value of a category is added to the path.

Figure 14:
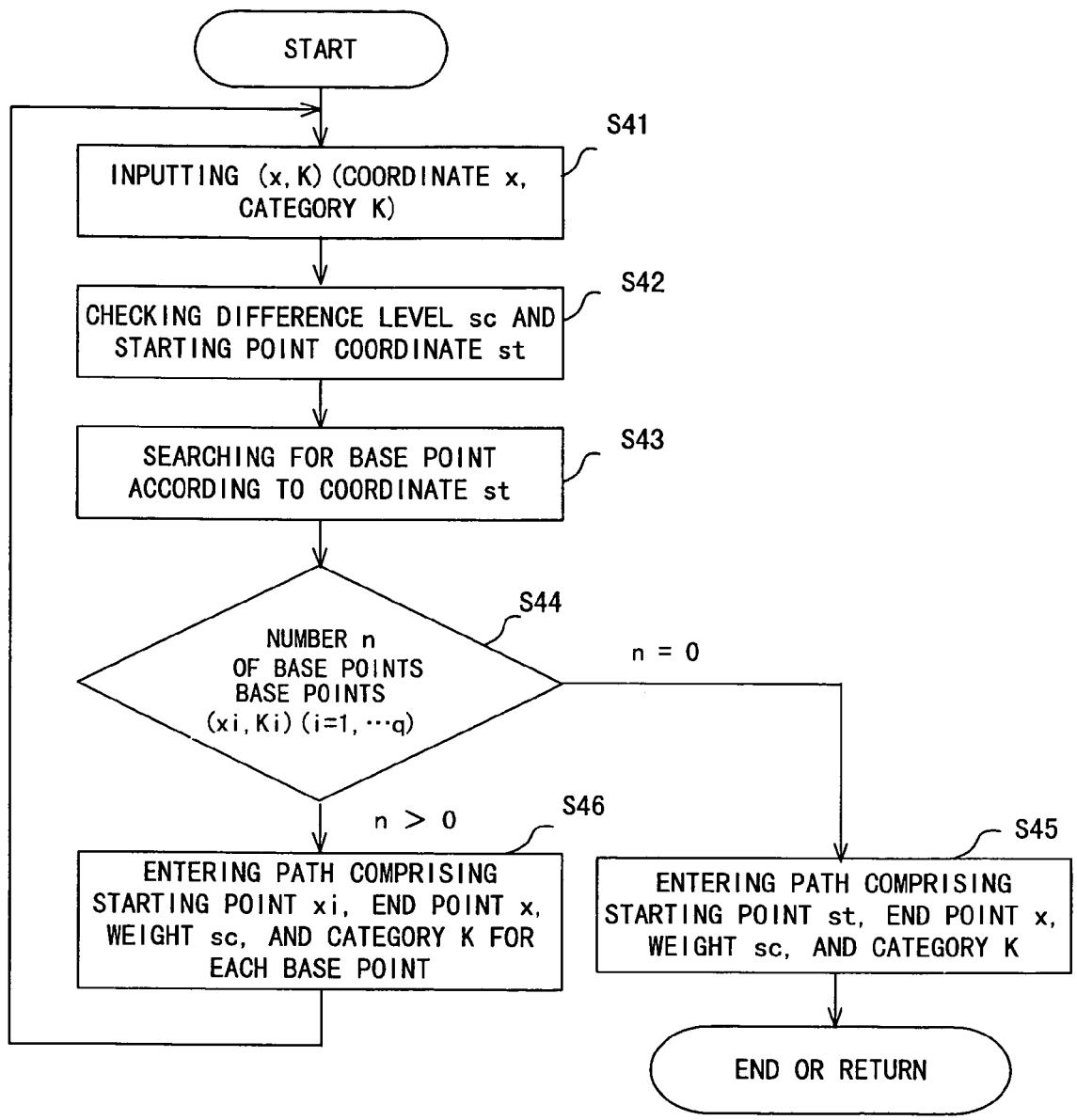
FIG. 14 is a flowchart of the process of generating a path according to an embodiment of the present invention.

FIG. 14 is a flowchart of the path generating process according to an embodiment of the present invention. In FIG. 14, for the coordinate x and the initial base point (x, K) corresponding to the category K (step S41), the difference level sc=Sc (x, K), and the starting point sc=St (x, K) are checked (step S42). Then, for x=st, the base point is searched for (step S43). A base point refers to a point where Sc (x, Ki) indicates the smallest value in the points where Sc (x, Ki)≦TH for (x, Ki), and the value of St (x, Ki) is constant in all categories Ki in the range st−th≦x≦st. If the number of base points is 0 (step S44), then a path having a starting point st, an end point x, weight sc, and a category K is entered (step S45), thereby terminating (returning) the process. On the other hand, if the number of base points is a, and the base points are (xi, ki) (i=1, . . . , a) (step S44), then a path having a starting point xi, an end point x, weight sc, and a category K is entered (step S46). Then, back in step S41, the similar process is performed for each base point.

Figure 15:
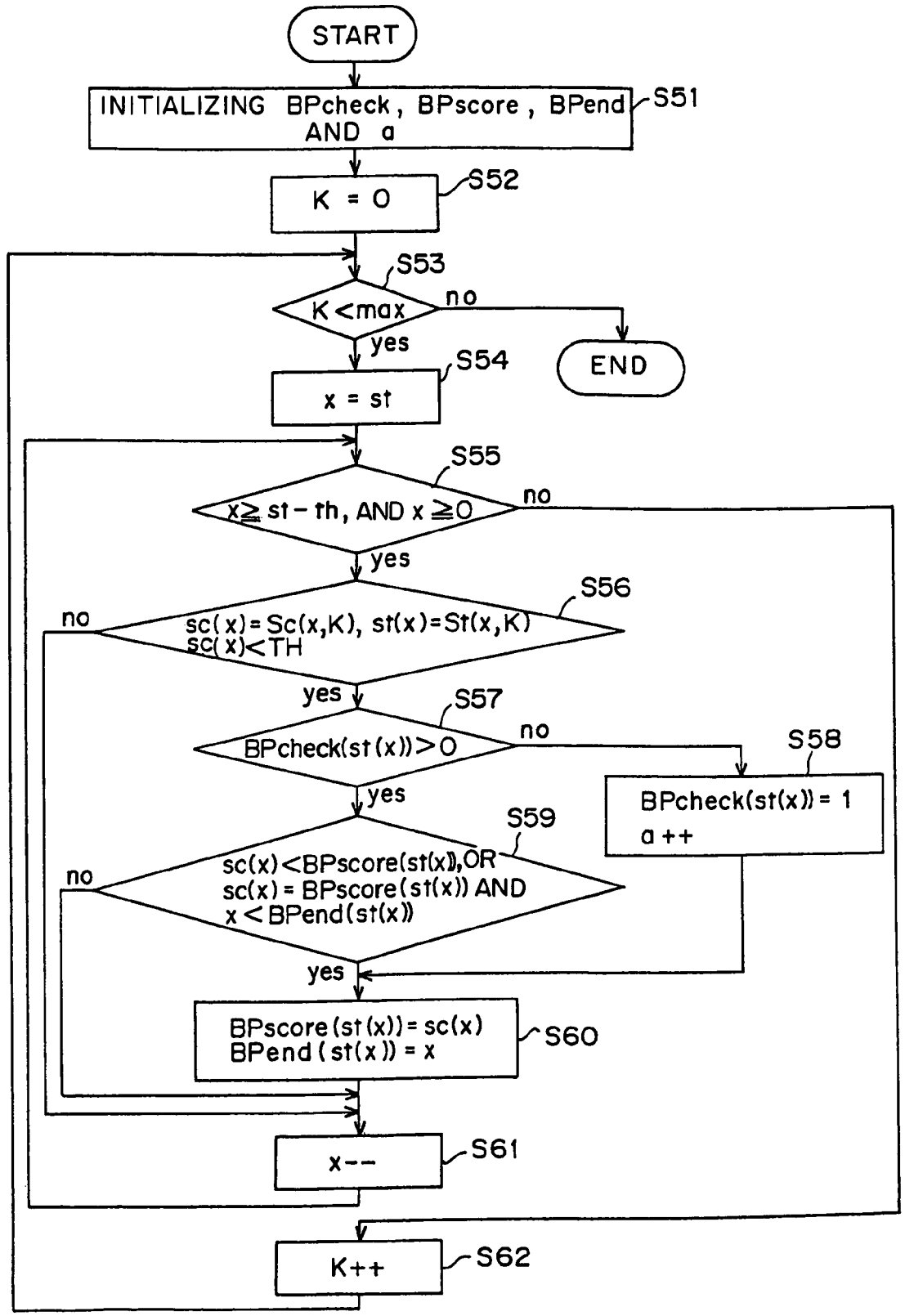
FIG. 15 is a flowchart of the process of searching for the base point according to an embodiment of the present invention.

FIG. 15 is a flowchart of the base point searching process according to an embodiment of the present invention. In FIG. 15, BPcheck, BPscore, BPend, and a are initialized (step S51). Each of the BPcheck, BPscore, and BPend is a dx array. BPcheck indicates whether or not the coordinate x has been checked, and the initial value is all 0. BPscore contains the value of the difference level sc, and the initial value is all −1. BPend contains a coordinate, and the initial value is all st. The integer a indicates the number of detected base points, and the initial value is 0.

Next, K is set to 0 (step S52), and x is set to st (step S54) when K<max (step S53) where max indicates the number of categories K to be recognized. When the conditions of x≧st−th and x≧0 (step S55) are not met, the value of K is increased by 1 (step S62), and control is returned to step S53. When x≧st−th and x≧0 (step S55), it is checked whether or not sc (x)=Sc (x, K), st (x)=St (x, K), and sc (x)<TH (step S56). If the condition sc (x)<TH is not met, x is decreased by 1 (step S61), and control is returned to step S55. On the other hand, if sc (x)<TH, it is determined whether or not BPcheck (st (x))>0 (step S57). If the condition BPcheck (st (x))>0 is not met, then BPcheck (st (x))=1, the value of a is increased by 1 (step S58), and control is passed to step S60. On the other hand, if BPcheck (st (x))>0, then it is determined whether or not the conditions sc (x)<BPscore (st (x)) or sc (x)=BPscore (st (x)) and x<BPend (st (x)) are met (step S59). If the conditions in step S59 are not met, control is passed to step S61. On the other hand, if the conditions in step S59 are met, then PBscore (st (x))=sc (x), BPend (st (x))=x (step S60). The above described process is performed on all categories K to be recognized for the coordinate x satisfying the conditions x≧st−th, and x≧0.

Figure 16:
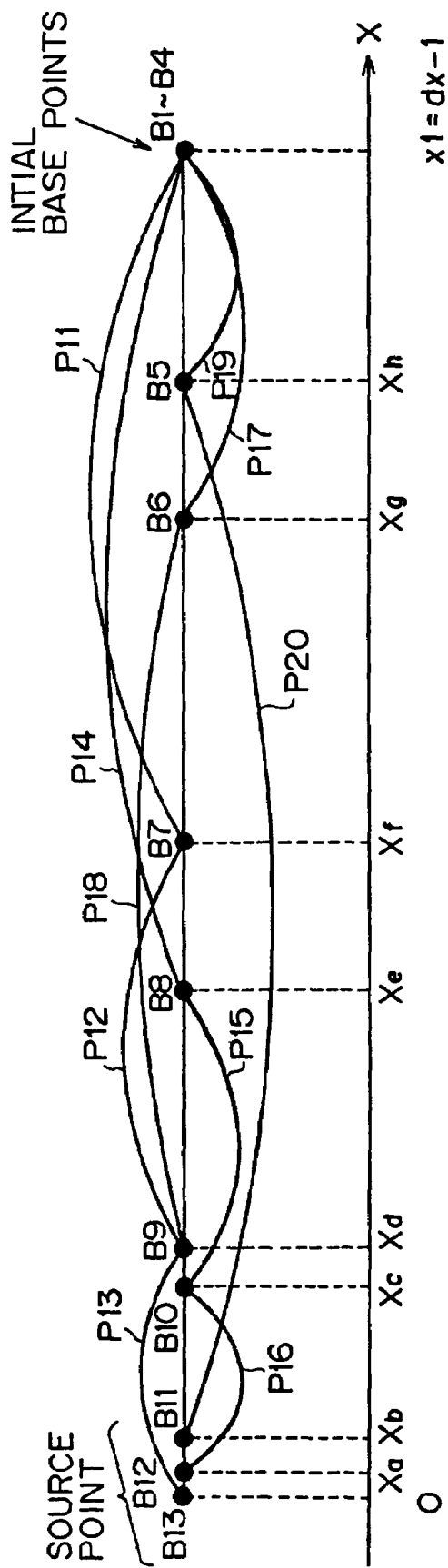
FIG. 16 shows an example of generating a path according to an embodiment of the present invention.

FIG. 16 shows an example of generating a path according to an embodiment of the present invention. In FIG. 16, for example, it is assumed that four initial base points B1 through B4 are selected at the point where x1=dx−1. As a result of detecting the base points B5 and B11 for the initial base point B1, the route of two paths P19→P20 is obtained. As a result of detecting the base points B6, B9, and B13 for the initial base point B2, the route of three paths P17→P18→P13 is obtained. As a result of detecting the base points B7, B9, and B13 for the initial base point B3, the route of three paths P11→P12→P13 is obtained. As a result of detecting the base points B8, B10, and B12 for the initial base point B4, the route of three paths P14→P15→P16 is obtained.

Each of the paths P11 through P20 is assigned an attribute comprising a starting point, an end point, weight, and a category. For example, the starting point xf, the end point x1, the difference level sc of the category corresponding to the initial base point B1, and the category corresponding to the initial base point B1 are assigned as attributes of the path P11. In addition, the starting point xd, the end point xf, the difference level sc of the category corresponding to the initial base point B7, and the category corresponding to the initial base point B7 are assigned as attributes of the path P12.

Then, the optimum route is searched for (step S33). In searching the optimum path, the optimum route is searched for in a set of paths generated in the above described processes. First, for each coordinate x, the paths Pi having the starting points at the coordinate x are listed. At this time, for these paths Pi, the functions for correspondence among a starting point, an end point, weight, and a category are st (Pi), ed (Pi), sc (Pi), and ca (Pi). In addition, assuming that the accumulation value of the weight at the coordinate t (>x) is q (t), and the value indicating the number of paths passed through is b (t), the following equation is set.

$$(q(ed(Pi))+sc(Pi))/(b(ed(Pi)+1) \tag{19}$$

The path Pi indicating the minimum value is selected, and the path Pi is set as Pi=arg (x).

Then, the following equations are set.

$$q(x)=q(ed(Pi=\arg(x))+sc(Pi=\arg(x)) \quad (20)$$

$$b(x)=b(ed(Pi=\arg(x))+1 \quad (21)$$

The following evaluation v (x) is computed for the source point in each coordinate after the above described computation is performed for all coordinates.

$$v(x)=q(x)/b(x) \quad (22)$$

where a source point refers to a point where one or more paths having the coordinate x as a starting point exist, and where a path does not have the coordinate x as an end point. The source points are arranged in order using the evaluation value v (x), and the coordinate indicating the smallest evaluation value v (x) is defined as x=Origin. When Origin is obtained, a sequence of paths for the shortest route can be obtained by inversely tracing the paths from the Origin. Then, the end point and the category assigned to the paths can be provided as a section point and a character recognition result respectively.

For example, in FIG. 16, the base point B9 can be reached through two routes P11→P12 and P17→P18. In this case, the computation is performed by the equation (19) up to t=xd, and a smaller resultant value is selected. Assuming that the route P11→P12 is selected, the route P19→P20 is obtained as a route to the source point B11, the route P14→P15→P16 is obtained as a route to the source point B12, and the route P11→P12→P13 is obtained as a route to the source point B13. When the source points B11 through B13 are obtained, the smallest evaluation v (x) obtained by the equation (22) is selected. If the source point B12 is selected, the coordinate xa corresponding to the source point B12 is defined as Origin. By inversely tracing the paths P14 through P16 from Origin, the section points xc and xe can be determined. In addition, the categories assigned to the paths P14 through P16 can be recognition results at respective segmentation positions.

As described above, according to the present invention, the entire image can be compared with each category for the character touching pattern in which each character cannot be clearly segmented from each other based on image features. Therefore, the category and the segmentation position can be made consistent in the obtained comparison result, and a combination of matching category and segmentation position can be obtained, thereby correctly segmenting and recognizing a character. In addition, by combining the segmenting process through comparison with a category and the character recognizing process, the character recognizing process can be performed with higher precision.

FIG. 17 is a block diagram of the configuration of an information processing apparatus for realizing the pattern segmenting process and the pattern recognizing process according to an embodiment of the present invention by software. In FIG. 17, 11 is a central processing unit (CPU) for performing the entire process, 12 is read-only memory (ROM), 13 is random-access memory (RAM), 14 is a communications interface, 15 is a communications network, 16 is an input/output interface, 17 is a display for displaying document data, etc., 18 is a printer for printing document data, 19 is memory for temporarily storing document data, etc. read from a scanner 20 for reading an input image, etc., 21 is a keyboard, 22 is a pointing device such as a mouse, etc., 23 is a driver for driving a storage medium, 24 is a hard disk, 25 is an IC memory card, 26 is a magnetic tape, 27 is a floppy disk, 28 is an optical disk such as CD-ROM, DVD-ROM, etc., and 29 is a path.

A program for segmenting and recognizing a pattern, the feature amount of a category, etc. can be stored in a storage medium such as the hard disk 24, the IC memory card 25, the magnetic tape 26, the floppy disk 27, the optical disk 28, etc. By reading a program for segmenting and recognizing a pattern and the feature amount of a category from the storage medium to the RAM 13, a pattern can be segmented and recognized. In addition, a program for segmenting and recognizing a pattern can be stored in the ROM 12.

Furthermore, a program for segmenting and recognizing a pattern, the feature amount of a category, the feature amount of an input image, etc. can be retrieved from the communications network 15 through the communications interface 14. As a communications network 15 connected to the communications interface 14, a radio communications network, for example, a LAN (local area network), a WAN (wide area network), Internet, an analog telephone network, a digital telephone network (ISDN: integral service digital network), a PHS (personal handy system), satellite communications, etc., can be used.

When a program for segmenting or recognizing a pattern is activated, the CPU 11 obtains the feature amount of a category from a storage medium such as the hard disk 24, or the communications network 15, etc. In addition, from an input image read through the scanner 20, or from an input image transmitted through the communications network 15, the feature amount of an input image is extracted. While changing a corresponding portion of the feature amount of an input image against the feature amount of a category, the feature amount of a category is compared with the feature amount of an input image. As a result of the comparison, when the portion corresponding to the feature amount of the category is obtained from the input image, the portion corresponding to the feature amount of the category is defined as the segmentation position of the input image. When the segmentation position of the input image is obtained, the category used in the comparison can be defined as a recognition result of a pattern segmented from the input image. Furthermore, to obtain a recognition result, a pattern segmented from the input image can be recognized. When a recognition result is obtained, the recognition result can be output to the display 17 and the printer 18, or transmitted through the communications network 15.

Figure 18:
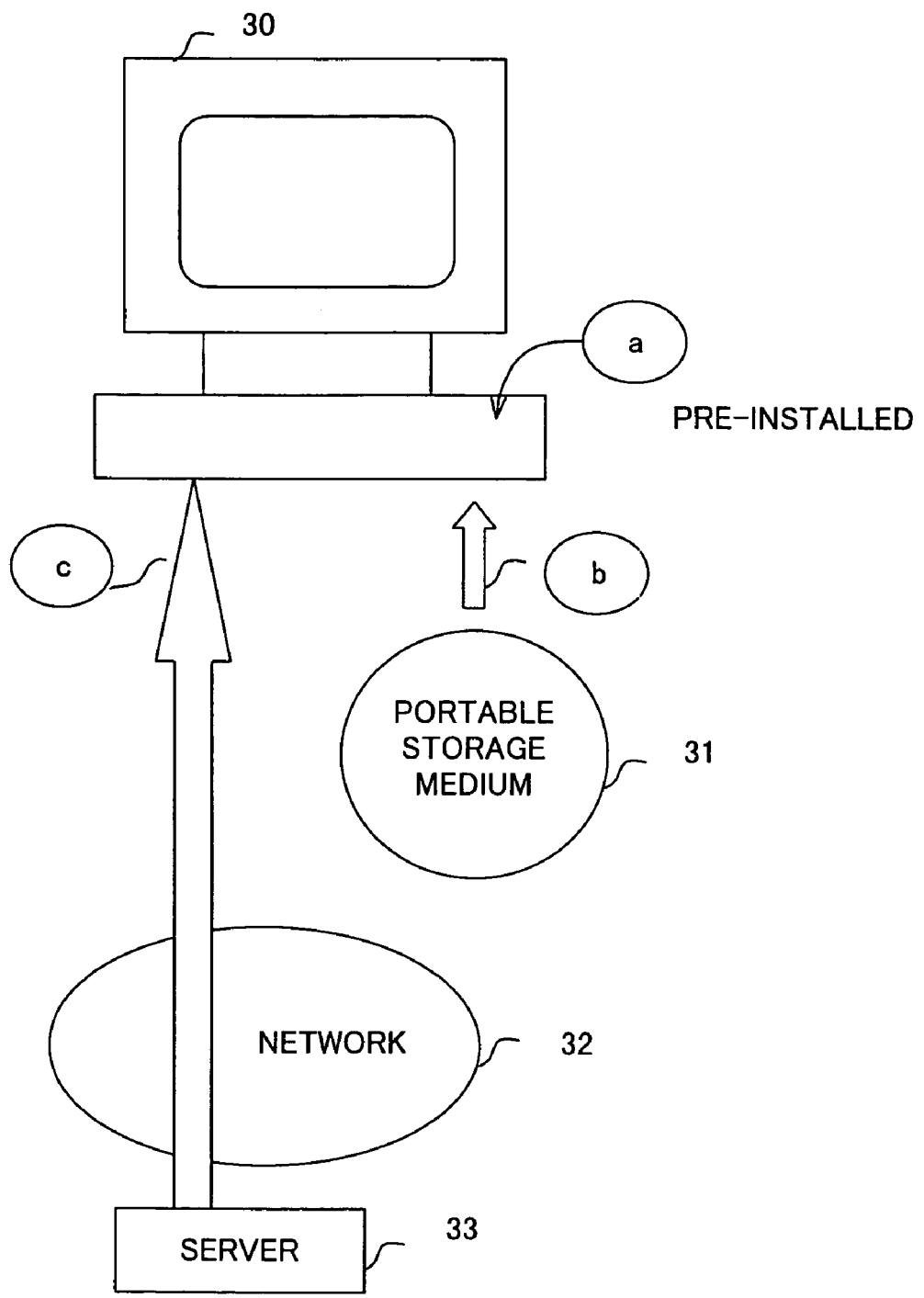
FIG. 18 shows the method of providing a software program, etc. for performing a pattern segmenting process and a pattern recognizing process according to an embodiment of the present invention.

FIG. 18 shows the method of providing a software program, etc. for segmenting and recognizing a pattern according to an embodiment of the present invention. A program, etc. is provided by an optional method in the three following methods.

(a) A program is provided as installed in an information processing apparatus 30 of a computer, etc. shown in FIG. 17. In this case, a program, etc. is, for example, pre-installed before delivery.

(b) A program is provided as stored in a portable storage medium 31. In this case, a program, etc. stored in the portable storage medium 31 is installed in an external storage device of the information processing apparatus 30 of a computer, etc.

(c) A program is provided from a server 33 in a network 32. In this case, the program, etc. can be basically obtained by the information processing apparatus 30 of a computer, etc. downloading the program, etc. stored in the server 33.

As described above, according to the present invention, a process of segmenting a pattern from an image can be performed with the entire form and the structure of a category as well as the outline or the unevenness of a pattern taken into account by segmenting a pattern based on a comparison result between the feature amount of a category and the feature amount of an image, thereby improving the pattern segmentation precision. Furthermore, a pattern corresponding to the feature amount of a category can be collectively segmented from an image, thereby preventing the pattern corresponding to one category from being sectioned at a number of points.

Furthermore, according to an aspect of the present invention, the comparison precision between the feature amount of a category and the feature amount of a character pattern of a character string image can be maintained even when distortion or deformation arises in the character string image by comparing the category with the character string image with both ends of the category corresponding to various points of the character string image without fixing both ends of the category to both ends of the character string image.

In addition, according to another aspect of the present invention, by allowing one end of a category to correspond to the coordinate of the element of a character string image, and by entering in a table the coordinate of the element of the character string image corresponding to another end of the category, the segmentation position of the character string image is determined, and the next segmentation position of the character string image can be easily obtained from the table, thereby efficiently extracting another character area from the character string image.

According to a further aspect of the present invention, it can be determined whether or not a segmentation position has been correctly segmented by checking whether or not an area not corresponding to any category to be recognized. Therefore, even when a plurality of segmentation areas are obtained from an image, the optimum segmentation position can be obtained from the plurality of areas.

According to a further aspect of the present invention, by separately setting the feature amount for segmentation of a category and the feature amount for recognition of a category, a pattern can be segmented using the feature amount for segmentation of a category, and the segmented pattern can be recognized using the feature amount for recognition of a category. Therefore, it can be determined whether or not the pattern can be correctly recognized using different feature amounts. In addition, when a segmenting process is performed, the feature amount appropriate for segmentation can be used, and when a recognizing process is performed, the feature amount appropriate for recognition can be used, thereby improving the segmentation precision and the recognition precision.

According to a further aspect of the present invention, when a pattern is segmented using the feature amount for segmentation of a category, the category is defined as a recognition result of the pattern, thereby obtaining the recognition result of the pattern only by segmenting the pattern from an image, and shortening the time taken to obtain a recognition result of a pattern.

What is claimed is:

1. A pattern segmentation apparatus, comprising:
   a feature amount extraction unit extracting a feature amount of an image;
   a feature amount setting unit setting a feature amount of a category;
   a feature amount comparison unit comparing the feature amount of the category with the feature amount of the image; and
   a segmentation unit segmenting an area similar to the feature amount of the category from the image based on the comparison result;
   wherein
   said feature amount comparison unit comprises a difference level computation unit comparing a difference level between the feature amount of the category and the feature amount of the image corresponding to the correspondence, and an optimum correspondence extraction unit extracting an optimum correspondence indicating a lowest difference level from the correspondence; and
   said segmentation unit segments a portion indicating a difference level corresponding to the optimum correspondence equal to or lower than a predetermined value.

2. The apparatus according to claim 1, wherein
   said feature amount comparison unit comprises a correspondence generation unit generating correspondence relationships between the feature amount of the category and the feature amount of the image, and compares the feature amount of the category with the feature amount of the image based on the correspondence relationships.

3. A pattern segmentation apparatus, comprising:
   a feature amount extraction unit extracting a feature amount of an image;
   a feature amount setting unit setting a feature amount of a category;
   a feature amount comparison unit comparing the feature amount of the category with the feature amount of the image; and
   a segmentation unit segmenting a portion corresponding to the feature amount of the category from the image; wherein
   said segmentation unit segments a portion indicating a difference level corresponding to the optimum correspondence equal to or lower than a predetermined value; and
   said feature amount comparison unit comprises:
   a correspondence generation unit generating correspondence between the feature amount of the category and the feature amount of the image, and compares the feature amount of the category with the feature amount of the image;
   a difference level computation unit computing a difference in level between the feature amount of the category and the feature amount of the image corresponding to the correspondence; and
   an optimum correspondence extraction unit extracting optimum correspondence indicating a lowest difference level from the correspondence.

4. The apparatus according to claim 3, further comprising:
   a combination unit generating a combination of segmentation areas that are segmented from the image in such a way that areas similar to a feature amount of any categories may be adjacently connected to each other on the image; and
   a segmentation area determination unit determining a segmentation area of the image by prioritizing a combination in which a value obtained by accumulating each difference level for the corresponding category in each segmentation area of the combination of segmentation area is the smaller of the combinations.

5. A pattern segmentation apparatus, comprising:
   a feature amount extraction unit extracting a feature amount of a character string image as a sequence of elements in a character string array direction;

a feature amount setting unit setting a feature amount of a category as a sequence of elements in a category array direction;
a correspondence unit corresponding a last element in the sequence of the elements of the category with each element of the character string image;
a search unit searching for an element of the character string image relating to the first element of the sequence of elements of the category in each of the sequence of elements of the image, to which the last of the sequence of elements of the category is related;
a difference level computation unit computing a difference level in a feature amount between the character string image and the category, whose sequence of elements are related to each other; and
a discrimination unit discriminating a segmentation position of a character from the character string image based on the difference level; and
wherein the first and the last elements of the feature amount set as an element sequence of a category in the array direction are independently scanned in the character string array direction to allow the feature amount of the category to correspond to the feature amount of the character string image.

6. The apparatus according to claim 5, wherein
said difference level is obtained from an accumulation result of a distance between elements from the first element to the last element in the sequence of the elements of the category.

7. The apparatus according to claim 6, wherein
said search unit makes a correspondence relationship of a current element in the correspondence relationship of past elements based on the correspondence relationship indicating the smallest accumulation value of the distance between elements.

8. The apparatus according to claim 5, further comprising:
an entry unit entering a set of a searched element of the character string image that is related to the first element of the sequence of elements of the category and a corresponding difference level for each category to be recognized, for each of the sequence of elements of the image which is related to the last of the sequence of elements of the category;
a search unit searching for a difference level whose value is equal to or smaller than a predetermined value of difference levels specified by an element corresponding to the segmentation position of the character string image;
an acquisition unit obtaining the element of the character string image corresponding to the difference level searched for by said search unit, from said entry unit; and
a computation unit computing a subsequent segmentation position of the character string image based on the element of the character string image obtained by said entry unit.

9. A pattern segmentation apparatus, comprising:
a feature amount extraction unit extracting a feature amount of a character string image as a sequence of elements in a character string array direction;
a feature amount setting unit setting a feature amount of a category as a sequence of elements in a category array direction and relating a last element of the sequence of the elements of the category to each of the sequence of elements of the character string image and relating each element linked to the last of the sequence of elements of the category to the element related to the last of the sequence of elements of the category or any element linked to the element related to the last of the sequence of elements of the category;
a search unit searching for an element of the character string image relating to the first element of the sequence of elements of the category in each of the sequence of elements of the image, to which the last of the sequence of elements of the category is related;
a difference level computation unit computing a difference level in a feature amount between the character string image and the category, whose sequence of elements are related to each other;
a discrimination unit discriminating a segmentation position of a character from the character string image based on the difference level;
an entry unit entering a set of a searched element of the character string image that is related to the first element of the sequence of elements of the category and a corresponding difference level for each category to be recognized, for each of the sequence of elements of the image which is related to the last of the sequence of elements of the category;
a search unit searching for a difference level whose value is equal to or smaller than a predetermined value of difference levels specified by an element corresponding to the segmentation position of the character string image;
an acquisition unit obtaining the element of the character string image corresponding to the difference level searched for by said search unit, from said entry unit;
a computation unit computing a subsequent segmentation position of the character string image based on the element of the character string image obtained by said entry unit
a path generation unit generating a path connecting the segmentation position of the character string image with the next segmentation position of the character string image computed by said computation unit;
an attribute assignment unit assigning a coordinate of the segmentation position, the difference level searched for by said search unit, and
the category corresponding to the difference level as attributes of the path;
a combination generation unit generating a combination of the paths by trading the character string image through the path;
an evaluation unit evaluating the combination of the paths based on an accumulation result of a difference level assigned to the path;
a selection unit selecting a combination of the paths based on the evaluation result; and
a section point determination unit determining a coordinate assigned to a path selected by said selection unit as a section point of the character string image.

10. The apparatus according to claim 9, further comprising
a recognition result output unit determining a category assigned to a path selected by said selection unit as a recognition result of an area in the character string image segmented in the segmentation position.

11. A method of segmenting a pattern, comprising:
setting a feature amount of a category;
extracting a feature amount of the an image;
generating an arbitrary correspondence relationship between the feature amount of the category and the feature of the image;

comparing the feature amount of the category with the
feature amount of the image based on the correspondence relationship, comparing a difference level between the feature amount of the category and the feature amount of the image corresponding to the correspondence, extracting an optimum correspondence indicating a lowest difference level from the correspondence, segmenting an area similar to the feature amount of the category from the image based on the comparison result; and segmenting a portion indicating a difference level corresponding to the optimum correspondence equal to or lower than a predetermined value.

12. The method according to claim 11, wherein
said feature amount of the category is compared with the entire feature amount of the image in a continuous DP method.

13. The method according to claim 11, wherein
said feature amount is peripheral features up to an n-th ($n \leq 1$) peripheral feature.

14. The method according to claim 11, wherein:
of all combinations of segmentation positions in which segment areas similar to a feature amount of any of the categories in such a way as to being adjacently connected on the image, a combination whose sum of a difference level between the image segmented in each segmentation position and the category similar to the image is a minimum is selected.

15. The method according to claim 11, further comprising:
segmenting a first segmentation area corresponding to the feature amount of the category; and
changing the first segmentation area when a second segmentation area cannot be segmented corresponding to a feature amount of a category from remaining areas of the image.

16. A character segmenting method, comprising:
extracting a feature amount of a character string image as a sequence of elements in a character string array direction;
setting a feature amount of a category as a sequence of elements in a category array direction;
scanning first and last elements of the sequence of elements of the category independently of the sequence of the elements of the character string image to allow the feature amount of the category to correspond to the feature amount of the character string image;
computing a correspondence relationship between the sequence of the elements of the category and the sequence of elements of the character string image based on the scanning;
computing a difference level in a feature amount between the character string image and the category, which are related to each other by the correspondence relationship; and
determining in what area of the character string image a feature amount similar to the feature amount of the category exists, based on the difference level; and
wherein the first and the last elements of the feature amount set as an element sequence of a category in the array direction are independently moved in the character string array direction to allow the feature amount of the category to correspond to the feature amount of the character string image.

17. A pattern recognizing method, comprising:
setting a feature amount of a category;
extracting a feature amount of an image;
generating an arbitrary correspondence relationship between the feature amount of the category and the feature amount of the image;
comparing the feature amount of the category with the feature amount of the image based on the correspondence relationship;
comparing a difference level between the feature amount of the category and the feature amount of the image corresponding to the correspondence,
extracting an optimum correspondence indicating a lowest difference level from the correspondence,
segmenting an area similar to the feature amount of the category from the image based on the comparison result,
segmenting a portion indicating a difference level corresponding to the optimum correspondence equal to or lower than a predetermined value; and
determining the category used for the segmentation as a recognition result of the area segmented from the image.

18. A computer-readable storage medium storing a program for executing at least:
setting a feature amount of a category;
extracting a feature amount of an image;
generating an arbitrary correspondence relationship between the feature amount of the category and the feature amount of the image;
comparing the feature amount of the category with the feature amount of the image based on the correspondence relationship,
comparing a difference level between the feature amount of the category and the feature amount of the image corresponding to the correspondence,
extracting an optimum correspondence indicating a lowest difference level from the correspondence,
segmenting an area similar to the feature amount of the category from the image based on the comparison result; and
segmenting a portion indicating a difference level corresponding to the optimum correspondence equal to or lower than a predetermined value.

19. A pattern segmentation apparatus, comprising:
feature amount extraction means for extracting a feature amount of an image;
feature amount setting means for setting a feature amount of a category;
feature amount comparison means for comparing the feature amount of the category with the feature amount of the image; and
segmentation means for segmenting a portion corresponding to the feature amount of the category from the image based on the comparison result; and
wherein
said feature amount comparison means comprises a difference level computation means for comparing a difference level between the feature amount of the category and the feature amount of the image corresponding to the correspondence, and an optimum correspondence extraction means for extracting an optimum correspondence indicating a lowest difference level from the correspondence; and
said segmentation means segments a portion indicating a difference level corresponding to the optimum correspondence equal to or lower than a predetermined value.

20. A pattern segmentation apparatus, comprising:
feature amount extraction means for extracting a feature amount of a character string image as a sequence of elements in a character string array direction;
feature amount setting means for setting a feature amount of a category as a sequence of elements in a category array direction;
a correspondence unit corresponding a last element in the sequence of the elements of the category with each element of the character string image;
search means for searching for an element of the character string image related to a first of the sequence of the elements of the category in each of the sequence of elements of the image to which the last of the sequence of elements of the category is related;
difference level computation means for computing a difference level in a feature amount between the character string image and the category whose sequence of elements are related to each other; and
discrimination means for discriminating a segmentation position of a character from the character string image based on the difference level; and
wherein the first and the last elements of the feature amount set as an element sequence of a category in the array direction are independently moved in the character string array direction to allow the feature amount of the category to correspond to the feature amount of the character string image.

21. An pattern segmentation apparatus, comprising:
a feature amount extraction unit extracting a feature amount of a character string image as a sequence of elements in a character string array direction;
a feature amount setting unit setting a feature amount of a category in a category array direction;
a correspondence unit corresponding a last element in the sequence of the elements of the category with each element of the character string image;
a search unit searching for an element of the character string image relating to a first element of the sequence of elements of the category in each of the sequence of elements of the image to which the last of the sequence of the elements of the category is related;
a difference level computation unit computing a difference level between the character string image and the category corresponding to each other in the sequence of the elements;
a discrimination unit discriminating a segmentation position of a character from the character string image based on the difference level;
an entry unit entering a set of an element of the character string image corresponding to the first element of the sequence of the elements of the category and a corresponding difference level for all elements in the character string image array direction;
a search unit detecting a difference level indicating a value equal to or smaller than a predetermined value in difference levels specified by each element corresponding to the segmentation position of the character string image;
an obtaining unit obtaining the element of the character string image corresponding to the difference level retrieved by said search unit from said entry unit;
a computation unit computing a next segmentation position of the character string image based on the element of the character string image obtained from said entry unit;
a path generation unit generating a path connecting the segmentation position of the character string image with the next segmentation position of the character string image computed by said computation unit;
an attribute assignment unit assigning a coordinate of the segmentation position, the difference level searched for by said search unit, and
the category corresponding to the difference level as attributes of the path;
a combination generation unit generating a combination of the paths by trading the character string image through the path;
an evaluation unit evaluating the combination of the paths based on an accumulation result of a difference level assigned to the path;
a selection unit selecting a combination of the paths based on the evaluation result; and
a section point determination unit determining a coordinate assigned to a path selected by said selection unit as a section point of the character string image.

22. The apparatus according to claim 21, further comprising
a recognition result output unit defining a category assigned to a path selected by said selection unit as a recognition result of a pattern sectioned at the section point.

23. A pattern segmentation process, comprising:
storing a character feature size for features to be extracted from a character string image;
scanning the character string image and extracting image feature sizes of features in the character string image;
comparing the character feature sizes to the image feature sizes and determining best matches between character feature sizes and image feature sizes;
comparing a difference level between the feature size of feature in the image corresponding to the correspondence,
extracting an optimum correspondence indicating a lowest difference level from the correspondence,
segmenting the character string image based on the best matches; and
segmenting a portion indicating a difference level corresponding to the optimum correspondence equal to or lower than a predetermined value.

* * * * *

UNITED STATES PATENT AND TRADEMARK OFFICE
CERTIFICATE OF CORRECTION

PATENT NO. : 7,095,891 B1
APPLICATION NO. : 09/577340
DATED : August 22, 2006
INVENTOR(S) : Hiroaki Takebe et al.

It is certified that error appears in the above-identified patent and that said Letters Patent is hereby corrected as shown below:

Column 20, Line 57, after "comprising" insert --:--.

Column 21, Line 21, change "$(n \leq 1)$" to --$(n \geq 1)$--.

Signed and Sealed this

Sixteenth Day of January, 2007

JON W. DUDAS
*Director of the United States Patent and Trademark Office*